United States Patent [19]
Howard

[11] Patent Number: 6,003,887
[45] Date of Patent: Dec. 21, 1999

[54] ROTARY CENTERING COMPENSATOR FOR VEHICLE STEERING SYSTEMS

[76] Inventor: Durrell U. Howard, 306 Krameria Dr., San Antonio, Tex. 78213

[21] Appl. No.: 09/121,910

[22] Filed: Jul. 24, 1998

[51] Int. Cl.[6] .................................................... B62D 15/00
[52] U.S. Cl. ...................... 280/89.11; 280/90; 74/388 PS
[58] Field of Search .................................. 280/89.11, 89, 280/90, 268; 74/527, 567, 388 PS

[56] References Cited

U.S. PATENT DOCUMENTS

| | | | |
|---|---|---|---|
| 4,410,193 | 10/1983 | Howard | 280/90 |
| 4,418,931 | 12/1983 | Howard | 280/94 |
| 4,534,577 | 8/1985 | Howard | 280/90 |
| 5,527,053 | 6/1996 | Howard | 280/90 |
| 5,536,028 | 7/1996 | Howard | 280/90 |

Primary Examiner—Paul N. Dickson
Attorney, Agent, or Firm—Pollock, Vande Sande & Amernick, R.L.L.P.

[57] ABSTRACT

A centering compensator for resisting movement of the steerable wheels of a vehicle to either side of a selected center position, and for returning them to this center position after each such movement. The apparatus includes a cam follower member connected to the steerable wheels for movement therewith and arranged to engage the cam surface of a cam ring having one or more static rotational positions relative to its housing mounted on the vehicle frame. The cam surface has a centering depression and the follower member is carried by an arm member extending laterally from a centering shaft mounted for rotational movement relative to the cam ring. An actuator assembly applies a resilient biasing force to the follower arm for pressing the follower member into the centering depression in response to fluid pressure in a piston and cylinder assembly. The center position may be varied either locally or remotely by changing the static rotational position of the cam ring or the length of a centering shaft linkage.

31 Claims, 32 Drawing Sheets

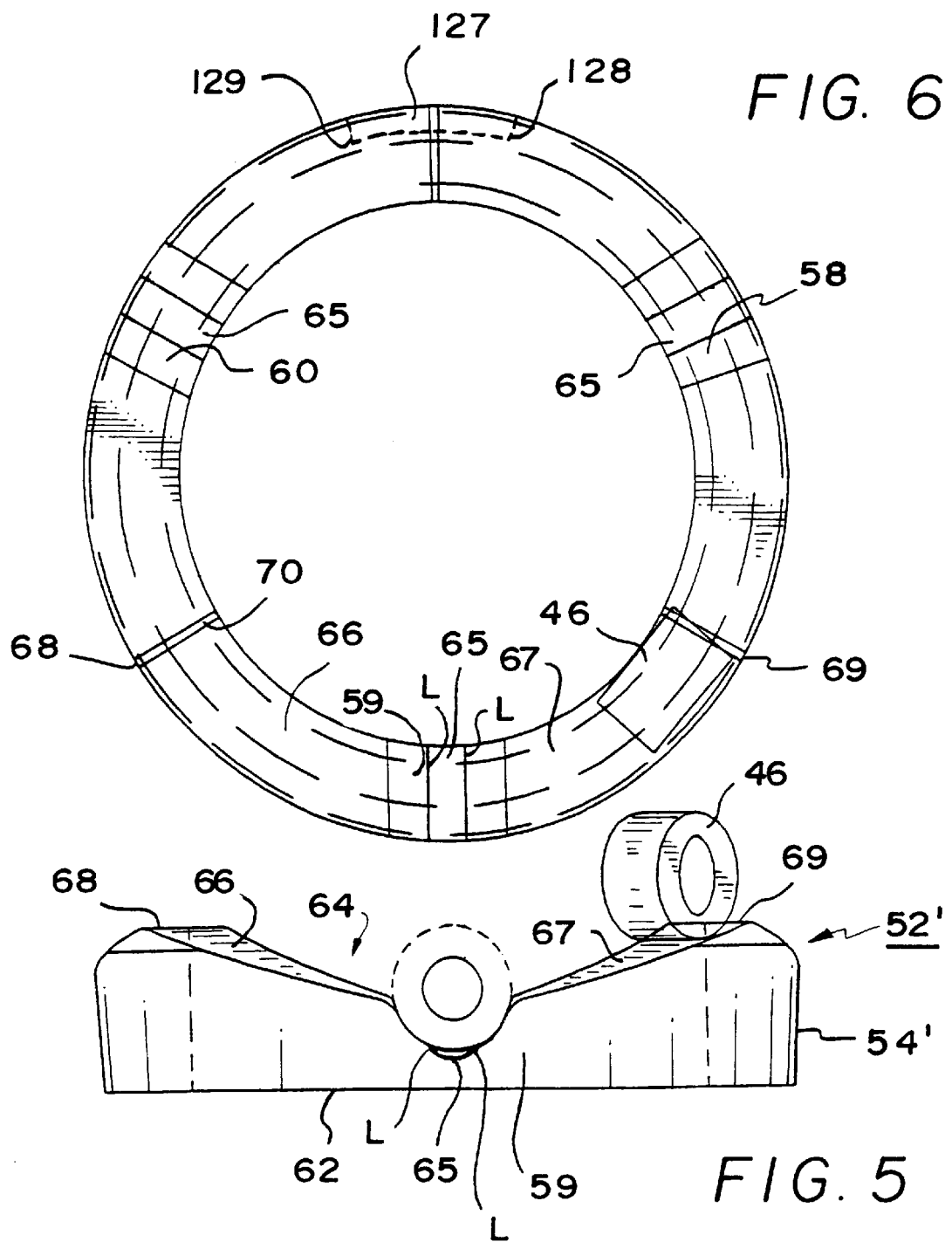

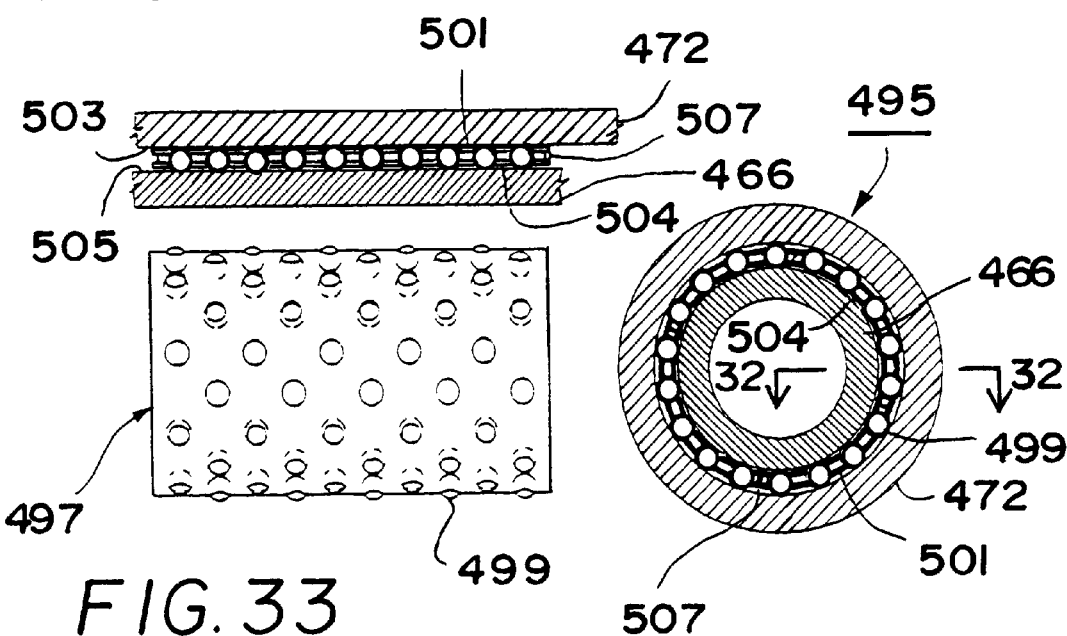

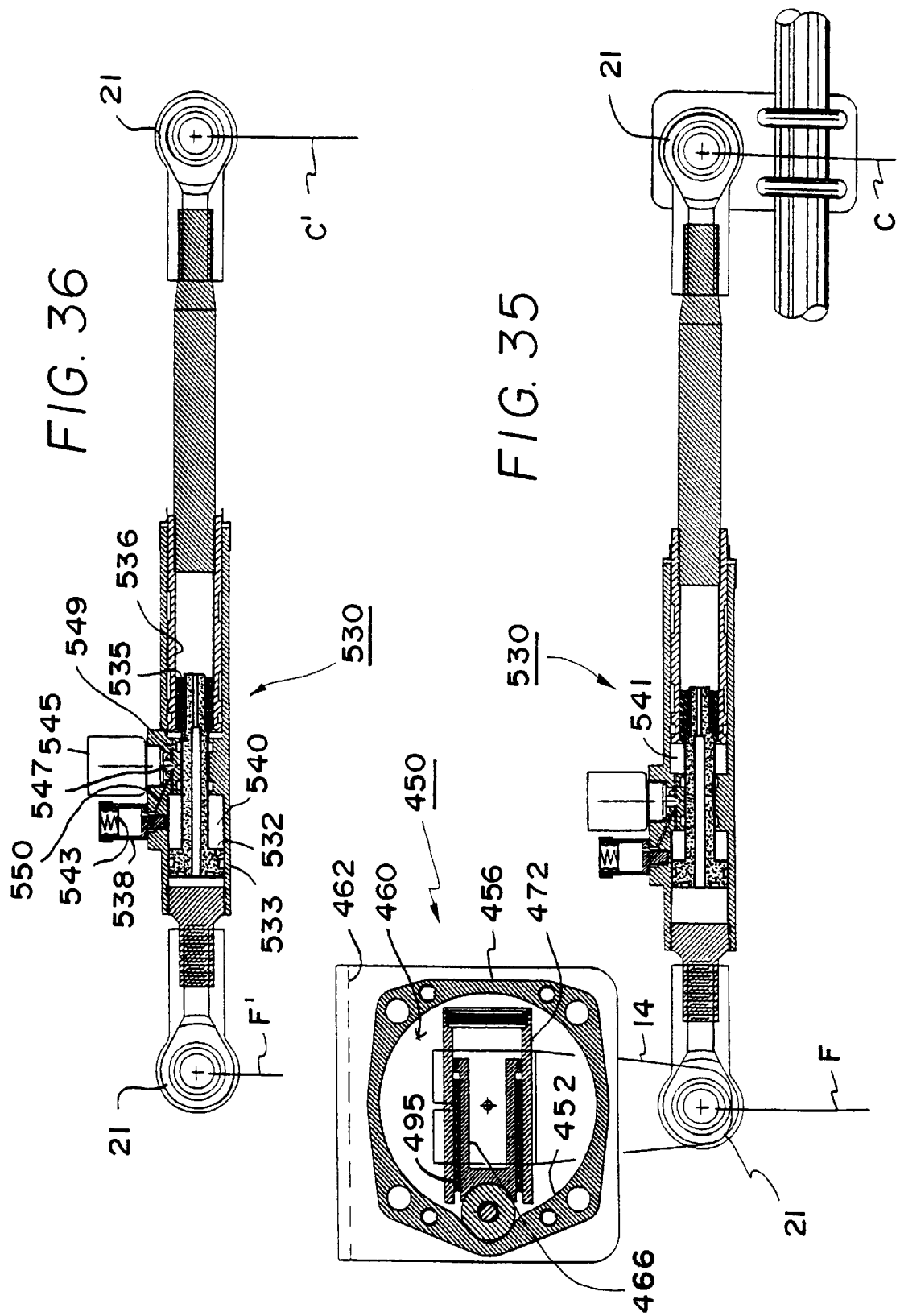

ROTARY CENTERING COMPENSATOR FOR VEHICLE STEERING SYSTEMS

FIELD OF THE INVENTION

This invention relates to vehicle steering systems and more particularly to a centering device for controlling the steerable wheels of a vehicle such as a motor home, bus, truck, automobile or the like so that a center steering position is selected and maintained in spite of spurious steering inputs, such as those caused by variable crosswinds, crown curvature or slant of the highway, or other factors tending to adversely affect vehicle steering by the driver.

BACKGROUND OF THE INVENTION

The steering systems of highway vehicles and the like are designed primarily for driver control. In these systems, the steering force required on the steering wheel and the ratio between steering wheel movement and movement of the steerable ground wheels depend upon the characteristics of the particular vehicle and the conditions under which it will usually be operated. A wide variety of extraneous forces can act on a vehicle steering system and spurious steering inputs caused by these forces must be dealt with satisfactorily in order to provide stable and controllable steering of a vehicle. As vehicle speed increases, the effects of any spurious steering inputs are magnified, making it necessary for the driver to exercise more precise and careful driving control.

Vehicles with steering systems having positive caster generally track relatively straight ahead and generally resist steering inputs away from center, including those of the driver. Such positive caster is provided by positive caster offset, which is also known as mechanical trail. Caster offset is the distance from the ground intersection point of a line drawn through the pivot axis of a steerable wheel to a point at the center of the area over which the wheel contacts the ground. The pivot axis of a steerable wheel of a motor vehicle is usually provided by a "king pin". Because the contact point of a steerable wheel with positive caster trails the pivot line point of the wheel, side forces cause the wheel to turn in the direction that the force is being applied. A good example of this is the way in which the castered wheels on the front of a shopping cart are easily turned in the direction of applied force.

The adverse effects described below are some of the negative aspects of achieving steering stability through generous amounts of positive caster offset. Because of the side force applied by gravitational pull on a slanted or crowned highway, positive caster offset causes a motor vehicle to freely turn to the low side, creating a steering wheel pull that requires counteractive steering input from the driver to keep the vehicle from leaving the highway. Thus, when driving on a crowned or slanted road, the driver must hold against wheel pull mile after mile. The culprit here is the hundred year old steering geometry that is responsible for the automatic, never failing pull to the low side of the roadway. The amount of driving fatigue that is directly caused by positive caster offset under these conditions may be appreciated by considering the many millions of miles driven by motorists each day on crowned or slanted highways.

Another fatiguing driving condition that may be encountered by a motorist is that of controlling a crosswind steering input. The amount of adverse steering input caused by crosswinds is directly related to the amount of positive caster offset, which is a classic example of having to balance a benefit with a detriment. The small amount of stability gained from castering the steerable wheels on a non-windy day may be paid for many times over when driving in a crosswind because of the destabilizing effect of the crosswind when combined with positive caster offset.

Positive caster offset also allows steering inputs from rutted and other imperfect roadway surfaces to steer back against the driver and thereby cause road wander, which is a universal driving complaint, particularly by driver's of heavy vehicles such as trucks and motor homes. Road wander occurs when the steered wheels do not hold a dedicated straight line. It also may be caused by wear or slack in the steering system and, where power steering is used, because of dead space travel of the power steering valve before it opens the fluid ports of the power steering unit. When the steered wheels wander, the problem is passed on to the driver who must make constant steering corrections.

Because of their high-roll center dynamics, trucks, buses, motorhomes and other large vehicles are especially susceptible to a condition known as "dynamic sway". Dynamic sway is similar to road wander and is caused by steered wheels that will not hold a straight line because of vehicle geometry. Attempts to solve this steering problem have universally been made by making the chassis stiffer in the roll axis. However, there are practical limits to how rigid the roll axis can be made.

Another drawback of prior art steering systems is that spurious inputs transmitted from the roadway through the steerable wheels affect substantially the entire steering assembly because the only stabilizing resistance is provided by the driver's manipulation of the steering wheel. The transmission of these various inputs between the steerable wheels and the steering wheel causes steering system oscillations and unnecessary component wear.

The ideal driving situation is therefore one where the steering system inherently causes the vehicle to travel in an unswerving straight line unless the driver intentionally turns the vehicle in another direction. Thus, the ideal steering system would require relatively little attention from the driver as the vehicle progresses along a straight line path down the roadway. From a steering standpoint, the vehicle should not respond to anything but the driver's steering commands and these must be of sufficient magnitude to overcome a significant resistance to turning away from center. In the absence of a steering input by the driver, the vehicle should literally do nothing but progress straight ahead.

SUMMARY OF THE INVENTION

The invention provides improved on-center control of the steerable wheels, and significantly reduces driver fatigue because it results in a major reduction in driver steering inputs. The invention also eliminates the need for positive caster offset by providing directional stability of steerable wheels with no positive caster, i.e., a caster angle of zero degrees (0°). Thus, on-center tracking of the steerable wheels is achieved by a means that does not have the deficiencies inherent in positive caster offset and that substantially reduces the need for corrective steering inputs from the vehicle driver.

The positive on-center feel of such a directionally stable vehicle provides a new level of driveability for motor vehicles, including automobiles, trucks, buses, campers and motorized homes. The invention thus achieves new levels of directional stability and driveability, which reduce driver fatigue to a level that cannot be achieved by conventional positive caster centering. When a driver turns the steering wheel of modern over-the-road vehicles, power steering does the work. If these vehicles utilize the present invention and the steering wheel is released, the centering compensator goes to work and makes the steered wheels track straight with great accuracy by counteracting spurious steering inputs as described below.

Gusty crosswinds cause castered front wheels of a motor vehicle to steer downwind, requiring constant driver corrections. With the centering compensator to stabilize castered front wheels and to hold a straight course, crosswind driving of vehicles with positive caster is dramatically improved. In addition, use of the compensator permits the elimination of positive caster or a substantial reduction in the caster angle of vehicles with positive caster, thereby significantly reducing the crosswind effect.

Road wander is also cured by the present invention which provides precision centered steerable wheels that track super straight, preventing unstable wheel behavior that causes road wander. The invention is also capable of generating sufficient compensating forces to properly control steering with offset wheels having oversized tires.

With the stabilized, on-center, straight track steering provided by the present invention, the ultimate in sway control can be achieved. The reduction in the dynamic sway of buses and motorhomes means that passengers can move about without being thrown off balance, and those with a tendency for motion sickness will be more able to enjoy the pleasures of road vehicle travel.

The invention also allows small adjustments to be made in the center position of the steering system to fine tune steering of the vehicle. Such fine tuning makes driving more pleasurable and less fatiguing. The centering compensator of the invention thus comprises a centering assembly having a center position that is adjustable to permit the center position of the steering system to be changed and reset to compensate for new or changed steering forces which would otherwise cause the vehicle to deviate from its straight ahead course. Changes in the center position of the steering system also may be necessitated by component wear. Even a change of tires may necessitate a change in the center position of the steering system to achieve straight ahead travel of the vehicle.

In addition, remote adjustment or "trimming" may be provided to permit the center position maintained by the compensator to be fine tuned while the vehicle is in operation from a location near the driver, which is "remote" relative to the location at which the compensator is connected to the steering system of the vehicle. With this version of the invention, the driver easily trims out steering wheel pull by the simple touch of a trim switch. According to a simpler version of the invention, the center position may be changed manually at the compensator or at its connections to the steering system.

The centering system of the invention may also provide remotely adjustable levels of resistance force for opposing off-center steering movements and of centering force for returning the steering system to its center position after a turning movement. The adjustment means may include provisions for requiring a predetermined level of steering force to initiate or breakaway into a steering movement away from center. This level of force is sometimes referred to in this specification as the "break away resistance". Different levels of break away resistance and of resistance force may be appropriate to compensate for different steering system characteristics on the same or different types of vehicles and/or for changes in the forces acting upon the vehicle. The level of break away resistance and of resistance force opposing movement away from center may be remotely adjusted either by a control mechanism operable by the driver or by a speed control mechanism responsive to the speed of the vehicle. The turning resistance selected should satisfy the road feel desired by the driver and be sufficient to overcome anticipated spurious inputs.

The centering force for returning the steering system to center may also be remotely adjusted either by a control mechanism operable by the driver or by a speed control mechanism responsive to the speed of the vehicle. In the present invention, the level of this return force may be the same as or may differ from the resistance force level. Both the resistance force and the return force provided by the centering system are increased or decreased to provide a level of force sufficient to overcome any spurious steering inputs and to suit driver road feel, particularly a feel of the steering wheel that lets the driver know when the steered wheels are beginning to move away from center and are closely approaching return to center.

The centering compensator for powered steering systems may be left on continuously because it will automatically turn off with the ignition and dome back on when the engine is started. With any malfunction of the vehicle's power steering, an automatic disabling feature of the invention shuts the system completely off. The centering compensator is also useable with non-powered steering systems, but the level of compensating forces provided is substantially less than for vehicles with power steering.

The centering compensator overrides spurious inputs to the steering assembly of vehicles with positive caster so that constant manipulation of the steering wheel by the driver is no longer required to hold the vehicle on a true straight ahead course. When used on steering systems with no caster or with negative caster, the invention provides the driver with a positive touch control not heretofore attainable with those types of systems. Positive stability is thereby achieved for otherwise marginally stable or previously unstable steering systems.

The invention also provides a distinctive feel when approaching or leaving the center position. Thus, the sense of touch is added to the visual sense to aid control of the vehicle and reduce driver fatigue. The turning resistance selected should satisfy the road feel desired by the driver and be sufficient to overcome anticipated spurious inputs.

In order to effectively resist spurious wheel movements and prevent such spurious inputs from reaching the steering gear and other steering components located between the tie rod and the steering wheel, the compensator of the present invention is connected downstream of the steering gear on the slow side of its ratio. The steerable wheels are therefore maintained in their straight ahead position irrespective of any spurious inputs or mechanical slack that may be present in the upstream, fast ratio portion of the steering assembly.

It follows from the foregoing that a principal object of the present invention is to provide a centering compensator having the foregoing features that is attachable to a vehicle steering system to reduce automatically the driver inputs required to maintain a preselected straight ahead course for the vehicle. To accomplish this, the present invention offsets spurious steering inputs with an opposing resistance force sufficient to keep the steerable wheels or other steering member in a preselected center position for maintaining straight ahead vehicle travel.

Accurately holding the steerable wheels on center prevents road wander, slanted road steering wheel pull, steering over-control, crosswind steering effect, and steering induced dynamic sway. Improvement in rutted road steering may also be realized. The positive centering feature also gives the steering system designer great latitude in reducing or eliminating the caster angle of the king pin.

Although the present invention is particularly useful as a centering system for motor vehicles, it can be employed to maintain the position of any steerable member moveable to either side of a preselected position. For example, the centering system can keep an outboard motor centered so that a boat follows a straight course over the water in the presence of spurious steering forces produced by wind and wave action. The centering system can also be used to center such steerable members as the rudders of ships or airplanes.

The manner in which the present invention accomplishes the foregoing objectives and advantages will now be described. The compensator may comprise a housing assembly enclosing a chamber for housing a cam means and a cam follower means, and an actuator assembly with a piston for biasing the cam follower. The piston may be actuated by fluid pressure or a spring means. The cam means may include a cam ring having an outer periphery that is adjacent to the inside surface of a housing wall. An inner edge of this cam ring is supported on a base member of the housing and the cam ring has a cam surface extending along at least a portion of its periphery. This cam surface includes at least one centering depression for receiving a corresponding roller of the cam follower means.

In a simplified version of the invention, the inner edge of the cam ring rests directly on and is secured to the base member of the housing. In remotely trimmable versions, the inner edge of the cam ring may be supported on the base member for rotation relative to the housing or a linkage of variable length may be connected between the cam follower means and the steering system of the vehicle, as described in more detail below.

The cam follower means includes at least one follower roller, which is rotatably mounted on a journal carried by a follower arm extending laterally from a centering shaft. In a preferred embodiment, there are three centering depressions spaced 120 degrees apart and three corresponding follower rollers, each rotatably mounted on a journal carried on a follower arm extending laterally from the centering shaft.

The centering shaft may be mounted for both axial sliding movement and rotary movement by appropriate sleeves, bearings, and/or journals carried respectively by a base member of the housing and by an opposing wall of the housing. Rotary movement of the centering shaft is provided by a centering lever with its proximate end connected to an external portion of the centering shaft extending axially beyond a wall of the housing. The distal end of the centering lever is connected to the tie rod or pitman arm of the vehicle or to some other component of the steering system so that this lever moves with movement of the steerable wheels of the vehicle. External stops may be provided on the housing to limit pivotal movement of the centering lever.

Where sliding movement of the centering shaft is provided, a piston may be connected to the centering shaft and arranged to reciprocate in a cylinder that is sealingly engaged by the piston. The wall of the cylinder cooperates with the piston to form a centering chamber for receiving a pressurized fluid that causes the piston to bias the centering shaft axially so as to resiliently press the follower rollers into respective centering depressions in the cam surface on an edge periphery of the cam ring when the cam follower means is in its centered condition. In an alternative arrangement where the cam surface is on an inner periphery of the cam ring instead of an edge periphery, the cam roller is resiliently pressed into the centering depression by a piston and cylinder assembly that extends laterally from the centering shaft and serves as a follower arm carrying the roller.

Each cam follower roller is of a size and shape to allow the roller when centered to contact simultaneously opposite sides of its corresponding centering depression. Due to the pressure in the centering cylinder, this contact provides a resistance force that resists movement of the steerable wheels to either side of their selected center position.

The pressurized fluid is maintained in the centering chamber by a fluid system connected to the chamber through a corresponding port. The fluid pressure system may take a variety of forms and the fluid supplied to the pressure chamber may be either a gas or a liquid. The fluid pressure provides the base level of resistance force for constantly resisting steering system movement away from center in response to spurious steering inputs. The fluid pressure also provides a return to center force for returning the steering system to its center or neutral position upon cessation of the steering force applied to the steering wheel. Due to the chamber pressure, each follower roller is pressed against and rides on its corresponding cam surface when out of the centering depression so that, depending on the cam surface shape, it may continue to provide both turning resistance and a return to center force throughout any movement of the steerable wheels to either side of their selected center position.

A pressure control means may be provided to permit chamber pressure to be varied remotely, either by a hand control mechanism operable by the driver or by a speed control mechanism responsive to the speed of the vehicle. Varying the fluid pressure changes both the resistance force opposing movement of the steering system away from a center position, and the return force provided for returning the steering system to its center position upon release of the steering wheel.

Where the fluid system utilizes a liquid, the pressure control means may include a pressure accumulator for storing fluid energy and a differential pressure valve requiring a chamber pressure higher than accumulator pressure for steering system movement away from center. The stored fluid energy provides the return force for returning the centering piston to its rest or inactive position upon cessation of a steering force. In this rest position, each follower roller has returned to the fully seated position in its centering depression.

Use of the differential pressure valve establishes an additional level of resistance to compressive movement of the piston such that turning of the steering wheel requires a steering force sufficient to overcome the total resistance to fluid flow represented by the accumulator pressure and the differential pressure in combination. An orifice may be placed in series with the differential pressure valve to limit the rate of piston movement away from its rest position by further increasing the level of fluid resistance as the rate of flow through the valve increases after breakaway from the rest position.

Free return flow from the accumulator to the pressure chamber upon cessation of a steering force may be provided by a line containing a check valve in parallel with the differential pressure valve and orifice. This parallel line may also contain an orifice for controlling the rate at which the steering system may be returned to its center position.

In a hydraulic embodiment of the invention, the centering cylinder may be pressurized by the power steering system of the vehicle. In a pneumatic embodiment, the centering cylinder may be pressurized by an air brake system of the vehicle. The pressurizing fluid may be provided instead by a hydraulic fluid or air pressurization system separate from other fluid systems of the vehicle. For example, a pressure accumulator system of the type described in the applicant's prior U.S. Pat. No. 4,410,193 may be employed for storing and providing hydraulic fluid under pressure to the centering piston.

Regardless of the type of fluid pressurization system employed, the system should generate sufficient pressure to return each follow roller to its fully seated rest position in the centering depression of the cam ring upon cessation of intentional steering inputs. The pressurization system should also constantly bias the centering piston assembly so that each cam roller is maintained in engagement with the cam surface of the cam ring at all times when the compensator is activated so that there is no slack in the compensator linkages at any time during its operation.

Spurious steering inputs tending to move the tie rod in either direction are therefore resisted by a corresponding resistance force generated by interaction between the cam ring and the cam follower rollers. Only when intentional steering wheel forces exceed a preselected break away level will the pitman arm of the steering system generate sufficient rotational force on the centering shaft to rotate it about its rotational axis, thereby causing the cam follower rollers to move relative to the cam ring.

After rotational movement of the centering shaft is initiated, the steering force required to sustain movement is a function of the shape of the cam surfaces on the shoulders extending away from opposite sides of the centering depressions, as well as of other centering phenomena acting on the steering system, such as positive wheel caster. The shape of the centering depressions and other compensator parameters may be chosen so that a break away steering force of at least about 20 pounds, preferably at least about 50 pounds, and more preferably at least about 70 pounds must be applied to the tie rod or the pitman arm in order to initiate break away turning movements of the steerable wheels.

If the steerable wheels are provided with positive caster, the sides of the depressions may be fared into flat portions of the cam surface adjacent to the depressions so that these portions will provide no centering force on the cam followers. In this case, the shoulders on opposite sides of the depressions are preferably shaped to provide a decreasing level of cam centering (and resistance) force until the caster centering force, which increases in proportion to turning angle with positive caster, is of sufficient magnitude to alone provide a rapid return of the steering system toward its center position. For example, there may be sufficient positive caster to permit the cam return force to go to zero at turning angles greater than about 20°, preferably greater than about 15°, and more preferably greater than about 10° on either side of center.

However, the cam surface profile outside of the centering depression may be such that the cam return force does not go to zero, but instead is effective over the entire range of turning angles, which for highway vehicles is usually limited to about 45° on either side of the centered wheel position (the 0° position)).

Another important feature of the present invention is the provision of a trimming means operable either locally or remotely for changing the preselected center position of the steerable member to be maintained by the compensator. In a simplified version of the invention wherein the cam ring is fixed to the cam housing base, trimming adjustments to change the center position of the steerable wheels may be made locally by manually adjusting the length of linkages between the centering lever and the steering system, or by manually changing the rotational relationship between the centering lever and the centering shaft, or by manually rotating the cam housing relative to the frame member on which it is mounted.

However, the invention also contemplates remotely trimmable versions wherein the length of the centering lever to steering system linkage may be changed, or wherein the cam ring is mounted for rotation so that its static position relative to the cam housing may be changed, by a trimming device that is actuated from a remote location, such as the driver's station. One such trimming device for repositioning the cam ring within the housing is a clutch-like mechanism wherein mating conical surfaces on the outer periphery of the cam ring and on the inner periphery of the cylindrical housing wall are disengaged from frictional contact, rotated relative to each other and then reengaged into frictional contact.

Rotation of this cam ring is provided by mounting it on ball bearings that are supported in the circular race of a track plate and are held in spaced apart positions by a bearing spacer plate. To provide the clutch-like mechanism, the track plate rests on and is moveable axially by release bearings driven along bearing ramps in the base member by a release plate that is arranged to be reciprocally rotated in response to an external driving means, such as a release piston contained in a release cylinder. The release piston may be driven to its release position by fluid pressure acting against a return spring. The release plate also may be reciprocated by an electric solenoid or other driving means connected to the release plate and acting against a return spring.

Rotation of the release plate in one direction drives the release bearings up their ramps causing upward axial movement of the track plate. Such axial movement of the track plate produces upward axial movement of the cam ring and this releases the cam ring from its frictional engagement with the housing wall and permits rotation of the cam ring within the housing. Rotation of the release plate in the other direction drives the release bearings down their ramps causing downward axial movement of the track plate. Such downward movement of the track plate produces downward axial movement of the cam ring and this places the cam ring back into frictional engagement with the housing wall, thereby locking the cam ring in a new static position within the housing.

Another such trimming device is a brake-like mechanism wherein a pair of shoes of high friction material are arranged to be pulled together out of engagement with, and then pushed apart into engagement with, a drum-like surface on an inner periphery of the cam ring to change its static position.

Other trimming devices provide positive repositioning of the cam ring within the housing. One such device is a gear mechanism driven by a reversible electric motor and connected to the cam ring through a slide plate pivotally mounted on an eccentric (off-center) journal carried by the last driven gear of a gear train. Rotation of this gear by the gear train causes the attached eccentric journal to rotate and this slidingly shifts the slide plate because the journal is fixed eccentrically relative to the rotational axis of the gear. Depending on the direction in which the slide plate is shifted, the cam ring is rotated in either a clockwise or a counterclockwise direction and thereby moved to a new static position in the housing.

Rotation of the cam ring to a new static position alters the position of each centering depression relative to the housing. Altering the position of the centering depression moves the rest position of the corresponding follower roller and the centering shaft around the central axis of the housing, thereby creating a new center position for both the centering lever and the vehicle steering system connected thereto.

As evident from the foregoing, a reversible electric motor is another means for affecting the trimming operation remotely. It is also within the scope of the present invention to employ other types of remotely controllable linear actuators for the trimming means. For example, hydraulic actuators may be used similar to those disclosed in the applicant's prior U.S. Pat. No. 4,410,193. In particular, the cam ring may be connected to a trim piston reciprocally carried within a hydraulic trim cylinder mounted on the vehicle frame and having dual trimming chambers, one on either side of the trim piston. Hydraulic fluid from a fluid system accumulator or other pressurized fluid source may then be used to move the trim piston in either direction and thereby cause corresponding rotation of the cam ring in either direction.

A driver control panel makes it possible for steering corrections to be made while driving. The panel may be conveniently located near the driver and provides three basic functions, namely, a switch to turn the system on and off, a centering pressure control and gauge, and a momentary trim switch. Activating, adjusting and trimming the centering system is therefore an easy and natural driving function. Should the driver sense a degree of steering wheel pull that becomes a bother, it is then quickly eliminated by pressing the trim switch.

The invention provides a distinctive on-center feel when approaching or leaving the center position. Thus, the sense of touch is added to the visual sense to aid control of the vehicle and reduce driver fatigue. A substantial turning resistance should be available at the pitman arm for small turning angles away from center, preferably 0°–5°, more preferably 0°–3°, and most preferably within one degree on either side of center. The turning resistance selected should satisfy the on-center feel desired by the driver and be sufficient to overcome anticipated spurious inputs.

The invention is particularly advantageous for large motor vehicles, where its use may reduce tire wear by as much as fifty percent (50%) by preventing oscillations of the steering wheel due to steering system geometry and/or driving conditions. When connected to weak or soft steering systems, i.e. those with no or negative caster, the invention provides the driver with a positive touch control not heretofore attainable with those types of systems. Positive stability is thereby achieved for previously unstable steering systems.

Although the present invention is particularly useful as a centering mechanism for large motor vehicles, it can be employed to position any steerable member moveable to either side of a preselected position. For example, the centering compensator can keep an outboard motor centered so that a boat follows a straight course over the water in the presence of spurious steering forces produced by wind and wave action. The compensator can also be used to center such steerable members as the rudders of ships or airplanes and the tongues of tandem trailers or railway cars. The compensator is useable with both power and non-powered steering systems, with the level of compensating forces provided usually being less for vehicles without power steering.

The invention may be used with steering systems having a reduction gear between the steering wheel and the steerable wheels. In this application, the apparatus is preferably connected to the steering system at a location between the steerable wheels and the reduction gear so as to be unaffected by any slack in the reduction gear or in components and connections between the reduction gear and the steering wheel.

The centering compensator is preferably connected between the steering system and a frame member of the vehicle in a position that allows the steerable member to move through its full range of steering movements while providing sufficient leverage for the apparatus to resist movement of the steerable member away from the center position producing straight ahead travel of the vehicle. The steering system connection may be made to any steering system component providing appropriate range and leverage, such as a tie rod which joins the two front steerable wheels of a highway vehicle, or the pitman arm connected to the steering gear. The frame connection may be made to any component serving as a fixed mounting relative to the steering system. This fixed component may be a transverse frame member, or a fixed axle or some other part carried by the vehicle frame instead of an actual frame member.

The compensator may also include control means for remotely and selectively varying both the amount of resistance to movement away from center and the amount of return force for recentering the steering system. Both of these remote adjustments may be made by the driver while the vehicle is in operation.

Therefore, electrical control and fluid control systems are employed for remotely operating the centering and trimming units of the centering compensator. The controls for actuating the control systems are preferably located at the driver's station of the vehicle. The electrical controls may comprise one or more switches, preferably of the type having a spring bias to a circuit-open position. Such switches are closed only momentarily when a button or toggle is held in a depressed position against the spring bias. Thus, the adjusting means, such as a motor, piston or solenoid, is actuated only while the button or toggle is depressed. Release of the button or toggle opens the circuit and stops the adjustment at the point selected.

The applicant's earlier U.S. Pat. No. 4,410,193, 4,418, 931, 4,534,577, 5,527,053 and 5,536,028, the entire contents of which are expressly incorporated herein by reference, solved many of the shortcomings existing in the prior art. The present invention provides improvements over these earlier patents, especially in the areas of simplicity, precision, and reliability.

A preferred embodiment of the invention may include the following features: resistance force for opposing steering movement away from center and return force for return to center each of sufficient magnitude to overcome spurious steering inputs, remotely variable levels of resistance force and return force through a predetermined range of turning movement, remotely trimmable center position, no substantial overshoot, free return to center position, fail-safe mode for disabling the centering compensator in the absence of power steering, precision centering, dampening of erratic steering movements, compact size, economical to manufacture and install, utility for old and new vehicles with or without power steering, and distinctive driver road feel.

BRIEF DESCRIPTION OF THE DRAWINGS

The invention, both as to its structure and operation, may be further understood by reference to the detailed description below taken in conjunction with the accompanying drawings in which:

FIG. 5 is a side view of the cam ring and one of the follower rollers of the invention;

FIG. 6 is a top view of the cam ring and follower roller of FIG. 5;

FIG. 31 is a transverse sectional view of the piston and cylinder follower arm taken along line 31—31 of FIG. 29;

FIG. 32 is a fragmentary sectional view taken along lines 32—32 of FIG. 31 and enlarged to show in more detail the slide bearing component of this embodiment;

FIG. 33 is a side view of the slide bearing component between the piston and cylinder of FIG. 31;

FIG. 35 is a sectional top view showing still another modification of the invention wherein the centering compensator of FIGS. 29–33 is combined with a linear trim assembly;

FIG. 36 is a sectional view similar to FIG. 35, but showing the linear trim assembly in a retracted position;

DETAILED DESCRIPTION OF THE INVENTION

Figure 1:
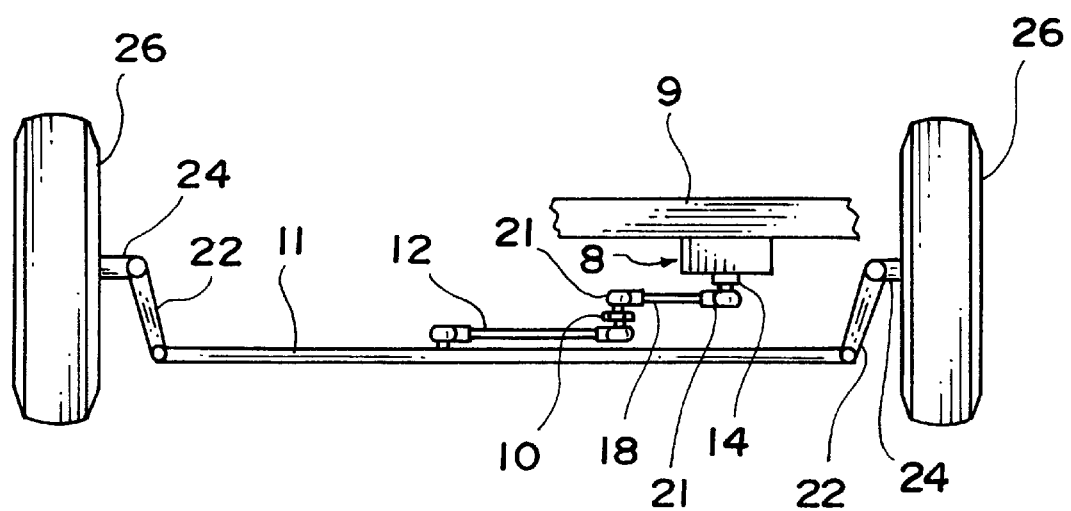
FIG. 1 is a plan view illustrating installation of the centering compensator of the invention between the frame and steering system of a motor vehicle.

A rotary centering compensator according to the present invention may comprise a centering unit, generally designated 8, which may be connected between the frame 9 and the pitman arm 10 of a conventional motor vehicle as shown in FIG. 1 of the drawings. Intentional steering inputs by the driver are transmitted from the pitman arm 10 to a tie rod 11 through a steering rod or drag link 12. The drag link 12 and the other steering system components connected thereto are conventional and include bell cranks 22, 22 carried by knuckles 24, 24, which support front steerable wheels 26, 26 for pivotal turning movement about respective king pins (not shown) mounted on the vehicle frame 9.

Figure 2:
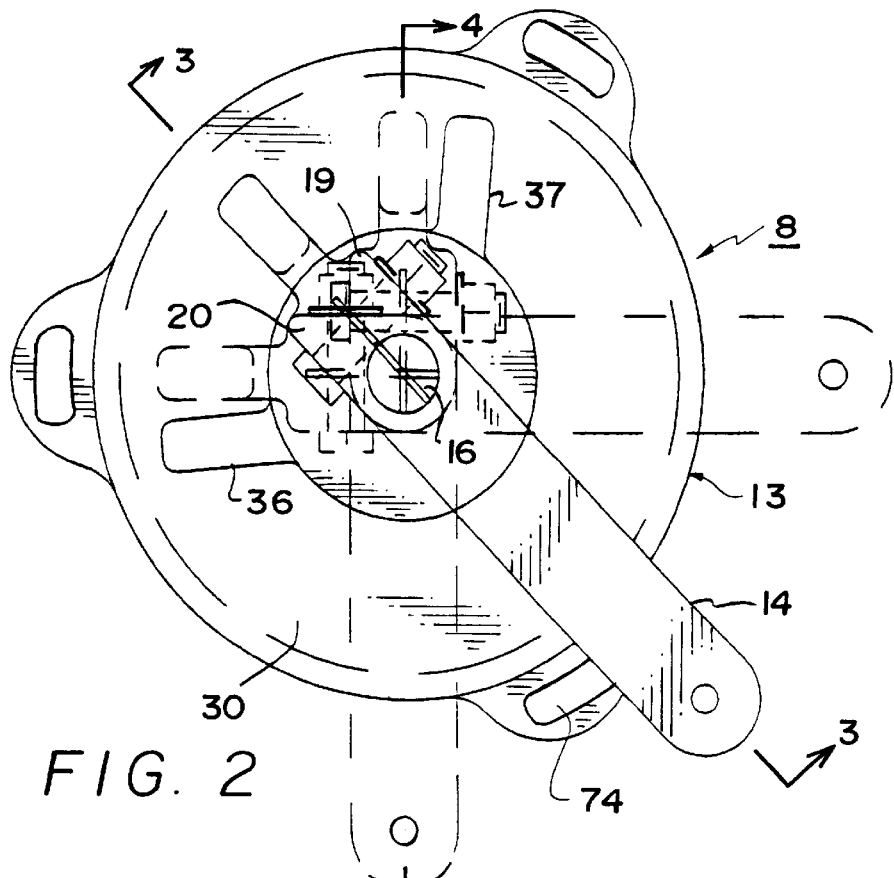
FIG. 2 is an enlarged top view of the centering compensator portion of FIG. 1.
Figure 3:
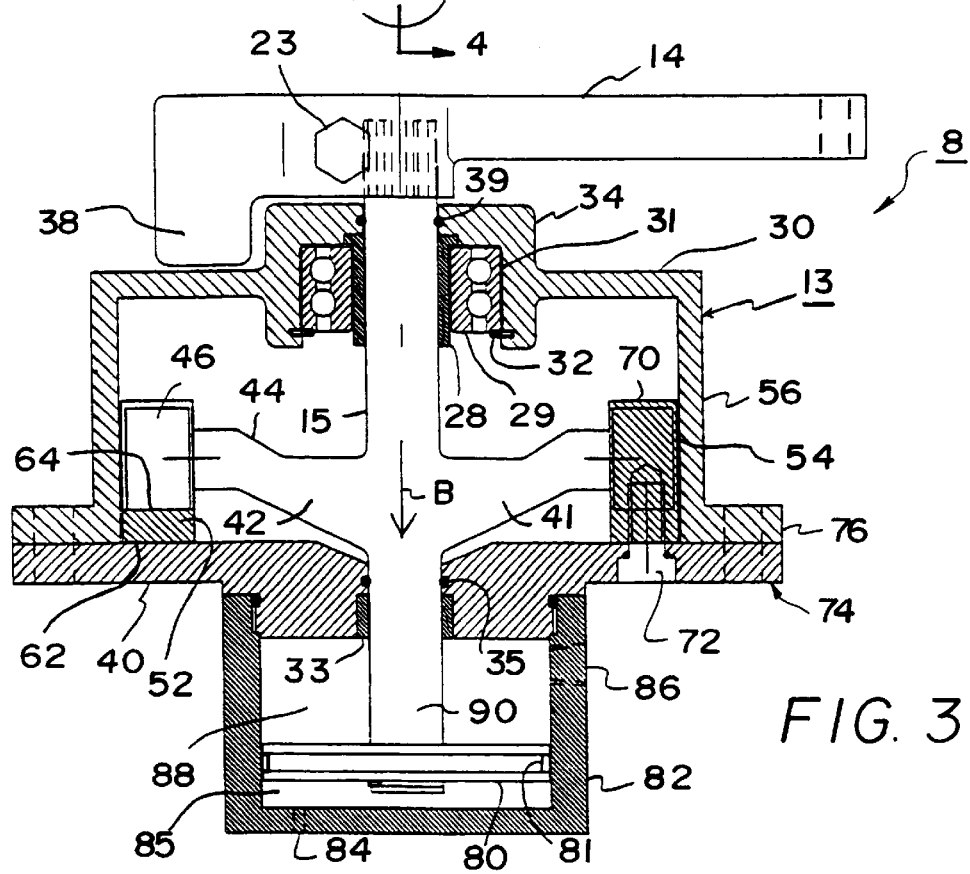
FIG. 3 is a sectional side view of the centering compensator taken along line 3—3 of FIG. 2 to show the cam follower components when the steering system is in its center position.
Figure 4:
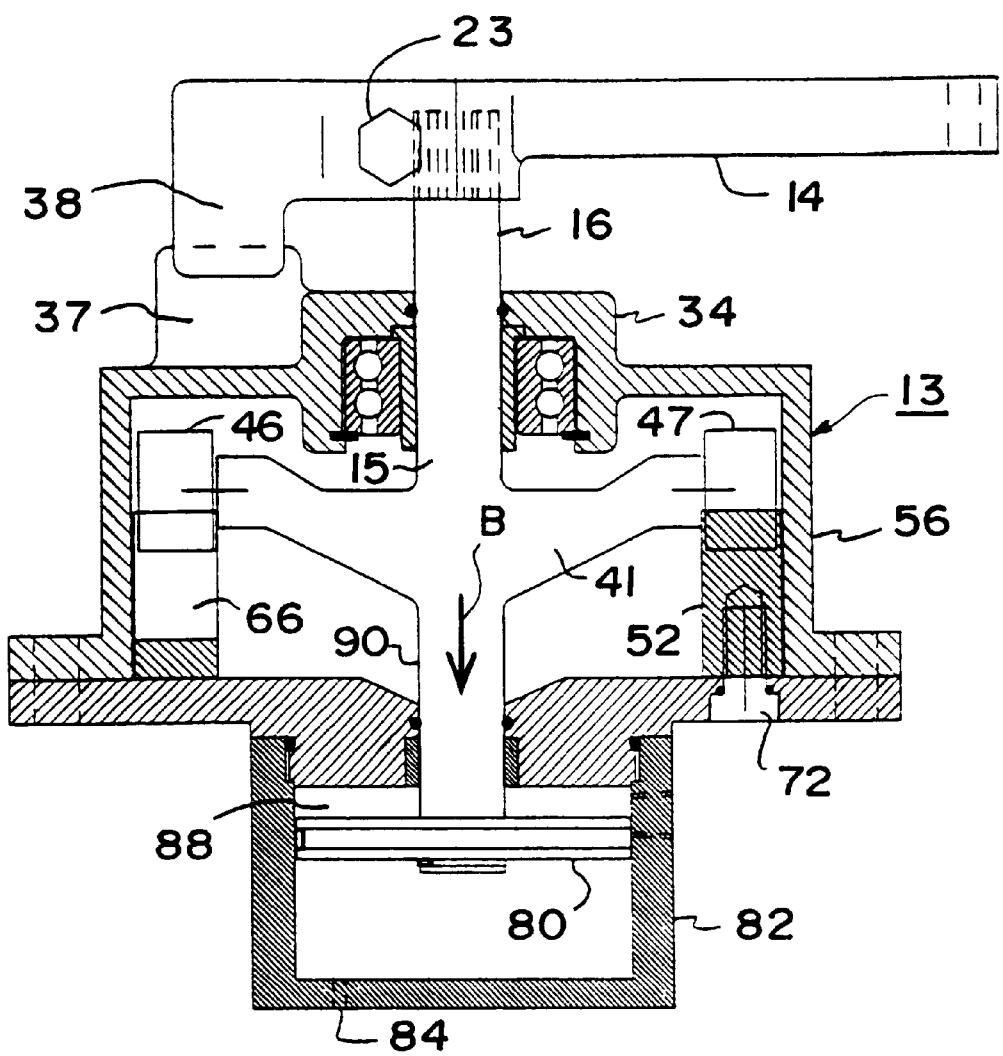
FIG. 4 is a sectional side view of the centering compensator taken along line 4—4 of FIG. 2 wherein the steering system has been turned away from its center position so that the cam follower components are shown in their biasing positions for causing a return to center.

Referring now to FIGS. 2–4, the compensator 8 includes a housing 13 containing a cam assembly and a cam follower assembly. The follower assembly comprises a centering lever 14 extending transversely from a centering shaft 15 rotatably and slidable mounted in the housing 13 by a sleeve bearing 28 and a ball bearing 29, which are held within a bearing chamber 31 in the top wall 30 of the housing by a retainer ring 32. The centering shaft 15 is also mounted for rotational and sliding movement in a base member 40 of the housing 13 by a sleeve bearing 33, and shaft seals 35 and 39 are provided in base member 40 and housing top wall 30, respectively.

The distal end of centering lever 14 is connected to the pitman arm 10 by means of a connecting rod 18 and a pair of ball joints 21,21 as shown in FIG. 1. As an alternative arrangement (not shown), the drag link 12 may be connected to one of the bell cranks 22, and connecting rod 18 attached to the drag link by a bracket. Another alternative is to attach connecting rod 18 to the tie rod 11 by a bracket. The arrangement selected depends on the location of potentially interfering components and the free space available for axial movement by the connecting rod.

The top wall 30 of the housing 13 includes a boss 34 from which project radially outward a pair of spaced apart stops 36 and 37 (FIG. 2) positioned to be engaged by a tongue 38 depending from the proximate end of centering lever 14. Stop 37 limits the rotation of centering shaft 15 by the centering lever 14 during turns of the steerable wheels 26,26 to the right, and stop 36 limits such rotation during turning of the steerable wheels 26,26 to the left.

Figure 7:
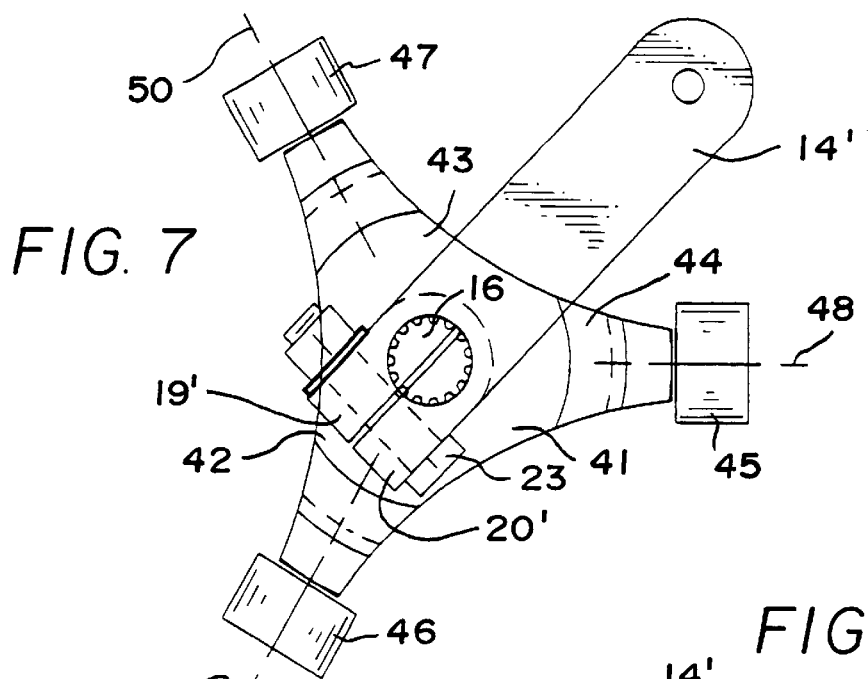
FIG. 7 is a sectional side view similar to FIG. 3, but of a modification of the invention wherein the centering compensator has remote trimming features.

As may be seen best in FIG. 7, extending laterally from centering shaft 15 are three follower arms 41, 42 and 43, only two of which may be seen in FIGS. 3 and 4. At the end of each follower arm is a dog leg journal 44 carrying a cam follow member in the form of a roller rotatably mounted on the distal end of the journal 44, rollers 45, 46 and 47 being carried respectively by follower arms 41, 42 and 43. The respective rotational axes 48, 49 and 50 of the follower rollers are preferably spaced 120 degrees apart.

The cam assembly contained in the housing 13 comprises a cam ring 52 having an outer peripheral face 54 that is adjacent and parallel to the inside surface of a cylindrical housing wall 56. The details of the cam ring may be seen in FIGS. 5 and 6 which show a slightly modified cam ring 52'. The peripheral face 54' of cam ring 52' in FIGS. 5 and 6 is shown as being conical for purposes described below in connection with the embodiments of FIGS. 8 and 9. In the embodiment of FIGS. 3 and 4, the peripheral face 54 of the cam ring 52 is cylindrical so that it fits closely adjacent to the inside surface of the cylindrical housing wall 56 as shown in these figures. Otherwise, cam ring 52 is substantially identical to cam ring 52'.

The inner edge 62 of the cam ring 52 is supported on the base member 40 of the housing 13 and the outer edge of the cam ring defines a cam surface 64 extending all the way around the periphery of this outer edge. The cam surface 64 includes three centering depressions 58, 59 and 60 preferably spaced 120 degrees apart as shown in FIG. 6, such that they are arranged to receive simultaneously a corresponding one of the follower rollers when the follower assembly is in its centered position. Each centering depression may include a groove 65 along the bottom thereof for providing lines of contact L,L with the follower roller to insure no slack centering as explained further below in connection with groove 565 in FIG. 38. The cam surface 64 also includes sloped shoulders 66 and 67 on opposite sides of each of the centering depressions 58, 59 and 60, and corresponding crests 68 and 69, respectively. Each of the crests may be further defined by a narrow flat surface 70.

The follower rollers are seated in their respective centering depressions when the follower assembly is in its centered position, and the follower rollers travel on the shoulders 66 and 67 when the follower rollers are out of their centering depressions during a turning movement of the steering system to which the centering shaft 15 of the compensator 8 is connected through the centering lever 14. The crests 68 and 69 may cooperate with the top housing wall 30 to limit the upward travel of the cam rollers along the shoulders 66 and 67 and thereby prevent each roller from leaving its corresponding one-third segment of the outer edge periphery. These limits are provided by making the gaps between the crests and the top housing wall 30 less than the diameter of the follower rollers, such that the top wall serves as a stop that may be used in addition to or in place of the external stops 36 and 37 shown in FIG. 2.

The can ring 52 is secured to the base 40 of the housing by three bolts 72 (only one being shown), each of which is threaded into the thickest portion of the cam ring beneath a corresponding flat 70. Thus, the cam ring 52 is fixed at one static position relative to the housing 13. The position of the cam ring relative to its housing will be referred to as its static rotational or azimuthal position and may be locally varied or remotely varied by any one of the trim mechanisms described below.

The housing 13 is held in a static position relative to the frame member 9 by means of three bolts (not shown), which pass through three apertures 74 in the base of the housing to secure it to the frame member. Since the apertures 74 pass through both a peripheral flange 76 at the base of the housing wall 56 and through the housing base 40, securing the bolts to the vehicle frame member 9 also fixes the housing wall 56 to the base 40.

As previously explained, the centering shaft 15 is mounted for both sliding and rotary movements relative to the housing 13. The purpose of these movements is to permit the follower rollers 45, 46 and 47 to travel along their corresponding segments of the cam surface 64, which requires that the cam rollers move in both peripheral directions and in both axial directions in response to rotation and sliding, respectively, of the centering shaft 15. In order to keep the follower rollers in firm engagement at all times with the cam surface 64, centering shaft 15 is biased axially in the direction of arrow B (downward relative to the orientation of FIGS. 3 and 4) by a piston 80 having a piston ring 81 and arranged for reciprocal movement in a cylinder 82. Cylinder 82 has a vent 84 for communicating an ambient air chamber 85 with ambient pressure and an opening 86 for communicating a pressurized fluid with a pressure chamber 88. An extension 90 of the centering shaft 15 serves as a piston rod which carries the piston 80 and is responsive to axial movement of the follower assembly while being biased by fluid pressure in centering chamber 88.

Such biasing of the centering shaft 15 provides a resistance force opposing movement of the follower rollers out of and away from their respective centering depressions, and also provides a return force which tends to return the follower rollers to their respective centering depressions when the rollers are traveling on the cam surface shoulders 66 and 67 during a steering system movement away from center. Accordingly, the steering system connected to the centering lever 14 is in its centered position when the follower rollers are fully seated in their respective centering depressions.

In FIG. 3, the follower rollers and the other components of the follower assembly are shown in their centered positions wherein the follower rollers 45, 46 and 47 are in their respective centering depressions 58, 59 and 60. In FIG. 4, the steering system of the vehicle has been turned away from its center position such that the follower rollers have moved out of and away from their respective centering depressions and are traveling on the shoulders 66 of their respective segments of the cam surface 64. As the follower rollers travel upward along the shoulders 66, the piston 80 undergoes compressive movement within the pressure chamber 88 as shown in FIG. 4. As necessary for such compressive movement, ambient air flows through vent 84 into the portion of the cylinder 82 that is on the opposite side of piston 80 from pressure chamber 88.

As may be evident from the foregoing, there are several ways in which the static rotational position of the cam ring of the centering compensator 8 can be adjusted to change the corresponding center position of the steering system to which the centering lever 14 is connected. One local adjustment means is illustrated by making the attachment holes 74 in the form of slots as shown in FIG. 2, such that the attachment bolts may be loosened and the housing 13 rotated so as to change the static positions of the cam ring centering depressions relative to the vehicle frame member 9. Another adjustment means is to make the connecting rod 18 of adjustable length so as to change the center of the steering system relative to the fixed positions of the centering depressions on the frame member, such as the local adjustment means of FIG. 29 or the remote adjustment means of FIGS. 35 and 36.

A further local adjustment alternative is to provide the centering lever 14 with a pair of ears 19 and 20, which are clamped together by a clamping bolt 23 so as to fixedly engage a splined distal end 16 of the centering shaft 15, and thereby prevent relative rotation between lever 14 and shaft 15. The center position of the steering system may then be changed by loosening the bolt 23, disengaging the splines, rotating lever 14 relative to shaft 15 and re-engaging the splines to change the azimuthal position of the centering lever 14 relative to the centering depressions. The clamping bolt 23 is then retightened, thereby providing a different rotational relationship between the lever 14 and the shaft 15.

Figure 8:
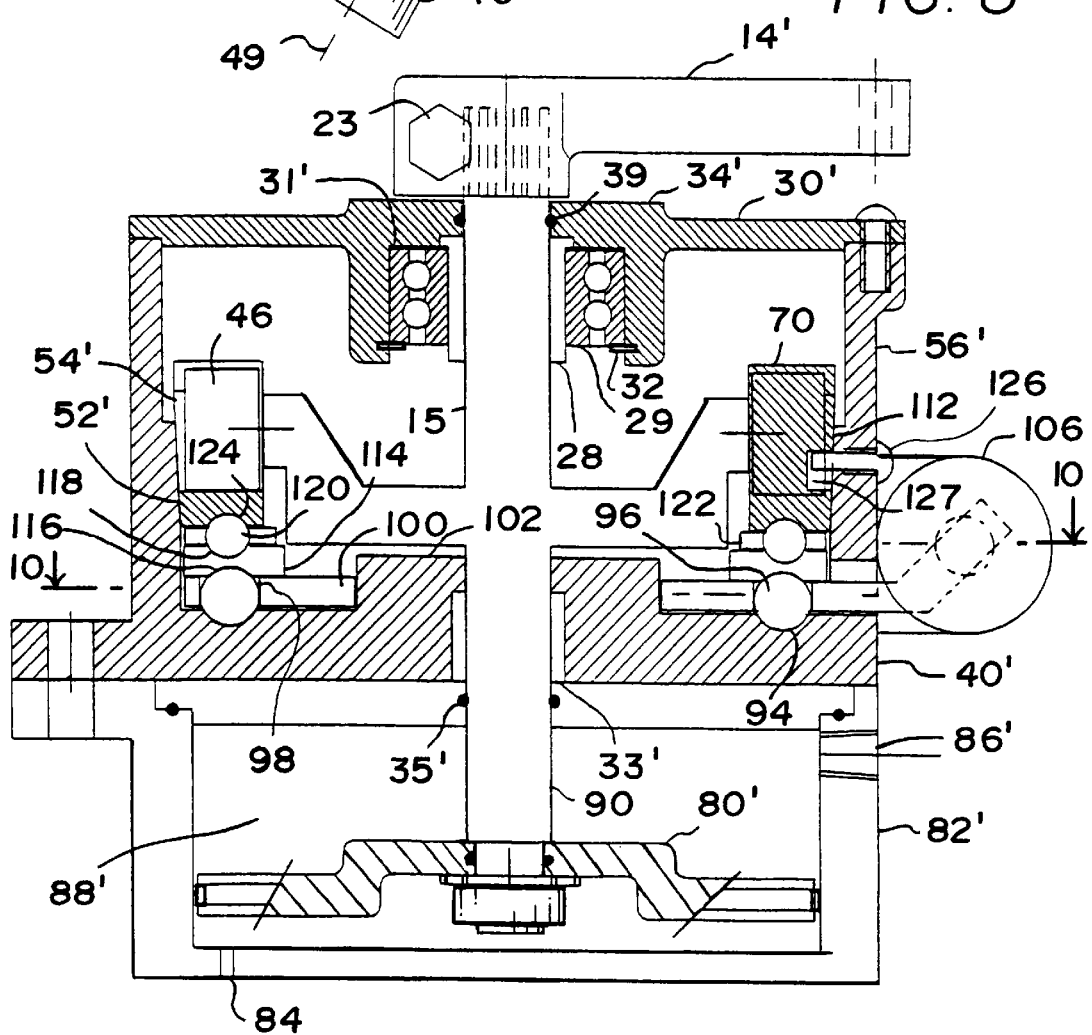
FIG. 8 is a top view of the centering lever and cam follower components of FIG. 7.

Referring now to FIG. 8, there is shown a further embodiment of the invention wherein means is provided for remotely trimming (changing) the center position of the steering compensator, and thereby the center position of the steering system to which it is connected. In the description that follows, the same part numbers identify components that have already been described above. A prime symbol (') is added to the part number where the part has the same function but a somewhat different structure.

In the embodiment of FIGS. 8–12, the housing base 40' includes a plurality of inclined bearing ramps 94 in which are seated a corresponding number of release rollers 96. The release rollers 96 ride within corresponding apertures 98 of a release plate 100 that is arranged for rotary reciprocating movement around a central boss 102 when driven by a trimming piston 104 contained in a trimming cylinder 106. A rod 108 of the piston 104 is pivotally connected to an ear 110 projecting radially outward from the release plate 100 as may be seen best in FIGS. 10 and 11.

Resting on top of the release bearings 96 is a track plate 114, which has a lower circular race 116 in which the release bearings 96 ride and an upper circular race 118 in which ride a plurality of ball bearings 120. The ball bearings 120 are held apart at substantially equal spacing by a spacer plate 122, and support the cam ring 52' for rotation relative to the housing wall 56' when the conical outer face 54' is not in frictional engagement with a conical housing surface 112. The ball bearings 120 may rotatably support a cam ring having a flat lower edge, but preferably travel in a circular race 124 on the lower side of the cam ring 52' opposite to race 118 in the track plate 114.

Figure 9:
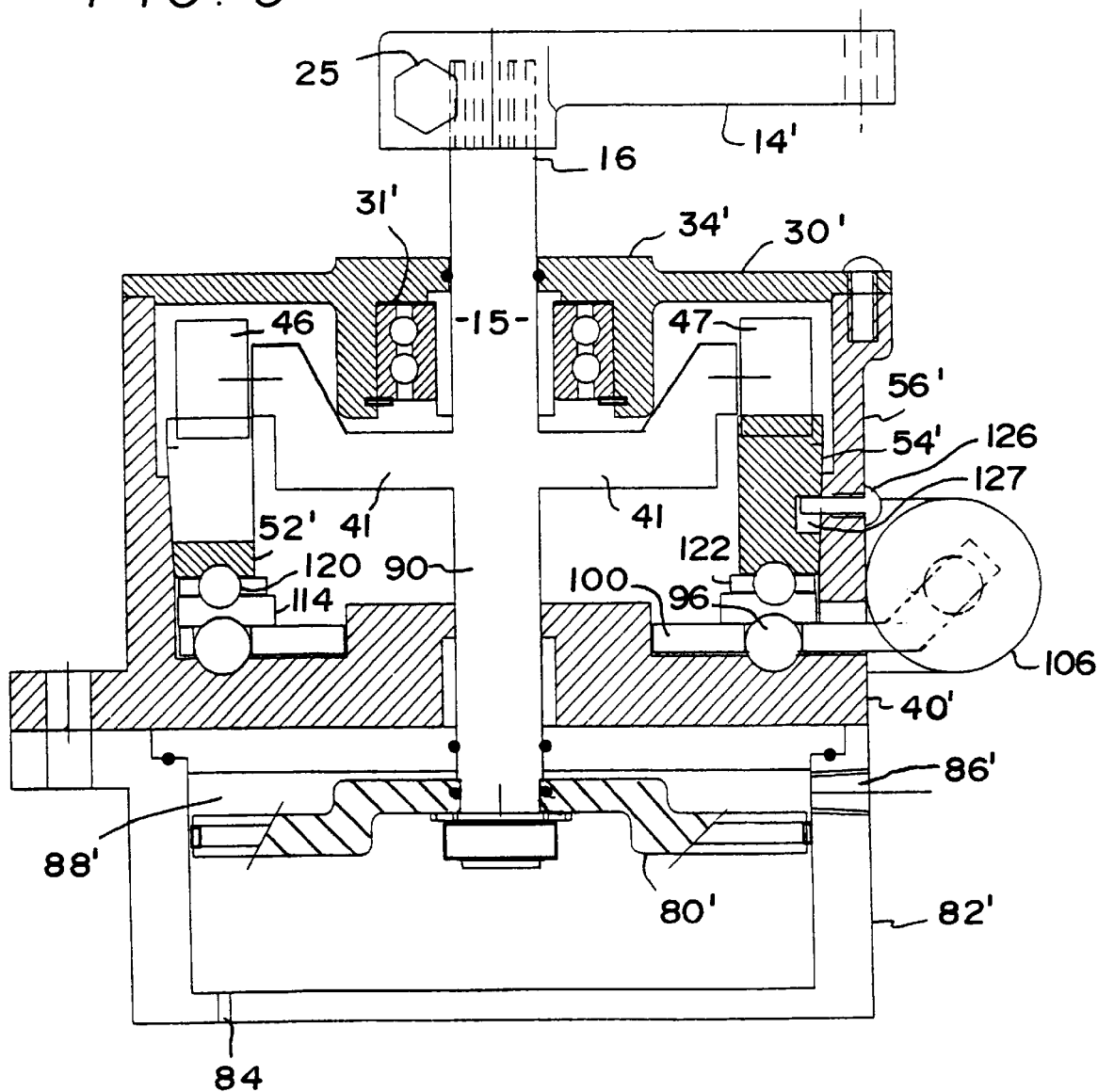
FIG. 9 is sectional side view similar to FIG. 4, but of the modification of the invention shown in FIG. 7.
Figure 10:
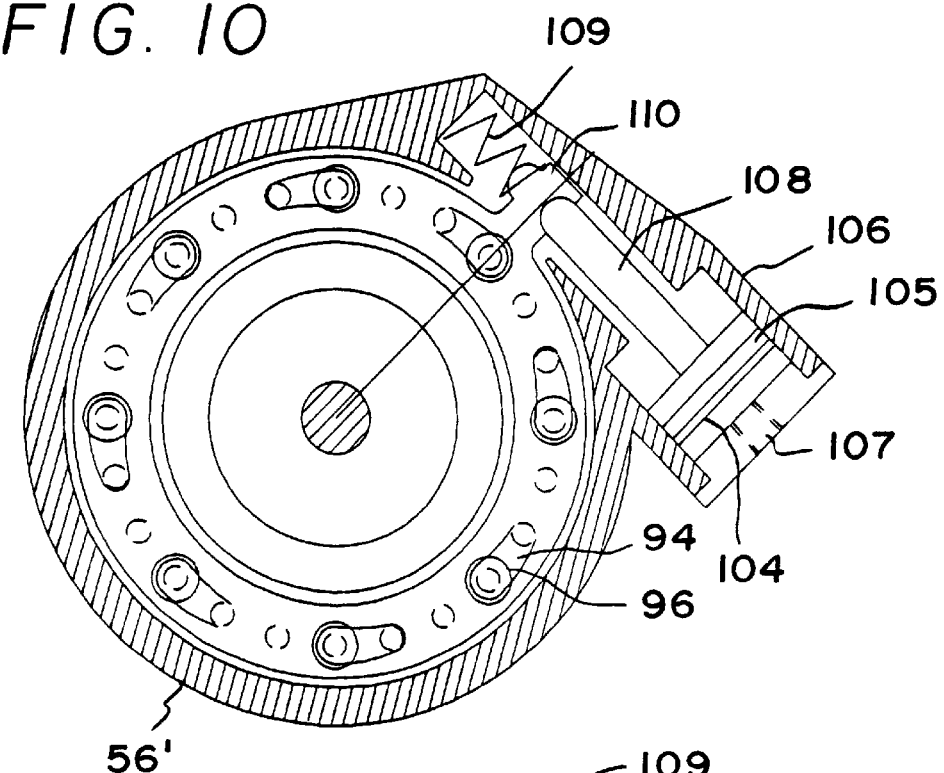
FIG. 10 is a sectional view along line 10—10 of FIG. 7.
Figure 11:
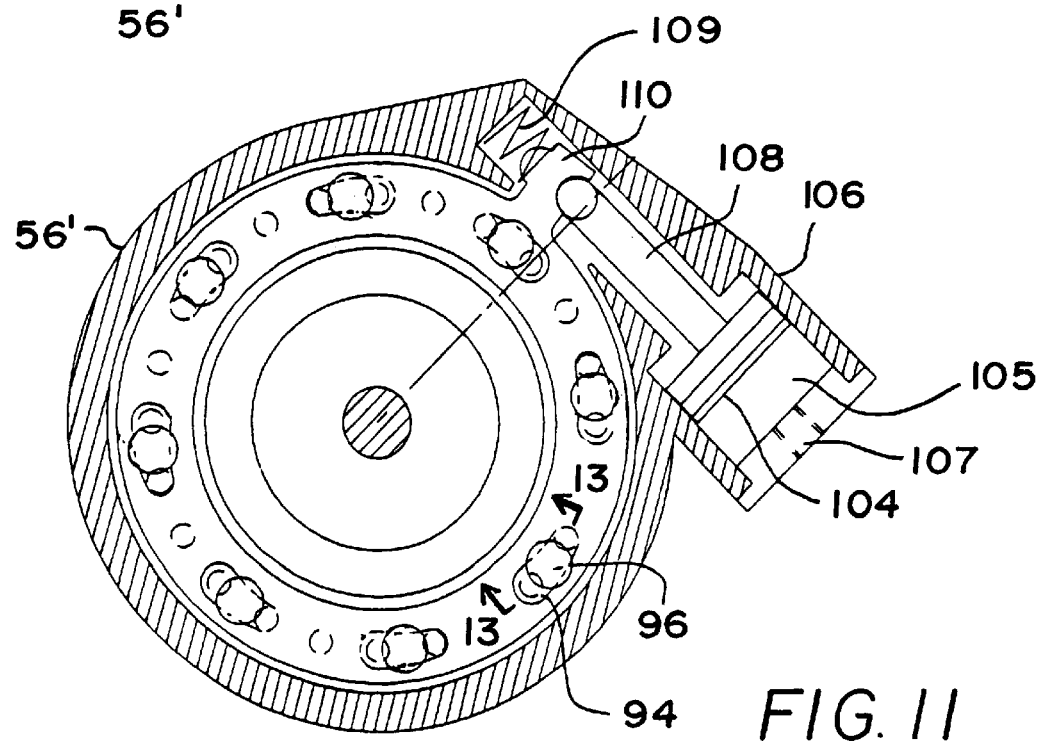
FIG. 11 is a sectional view similar to FIG. 10, but wherein the remote trimming means has been actuated for release of the cam ring from engagement with the cam housing.

In FIGS. 8 and 9, the conical outer face 54' of the cam ring 52' is frictionally engaged with the conforming conical face 112 on the inside surface of housing wall 56'. This frictional engagement fixes the cam ring 52' in a static position relative to the housing wall 56', which thereby establishes a center position for both the compensator and the steering system to which it is connected. Cam ring 52' is in the same static position in FIG. 8 as in FIG. 9, the former showing the follower components in their center position and the latter showing the follower components in an away from center position in which the follower rollers 45, 46 and 47 have travelled upward along the cam shoulders 66 during a turning movement away from center, similar to the follower roller positions shown in FIG. 4.

Figure 12:
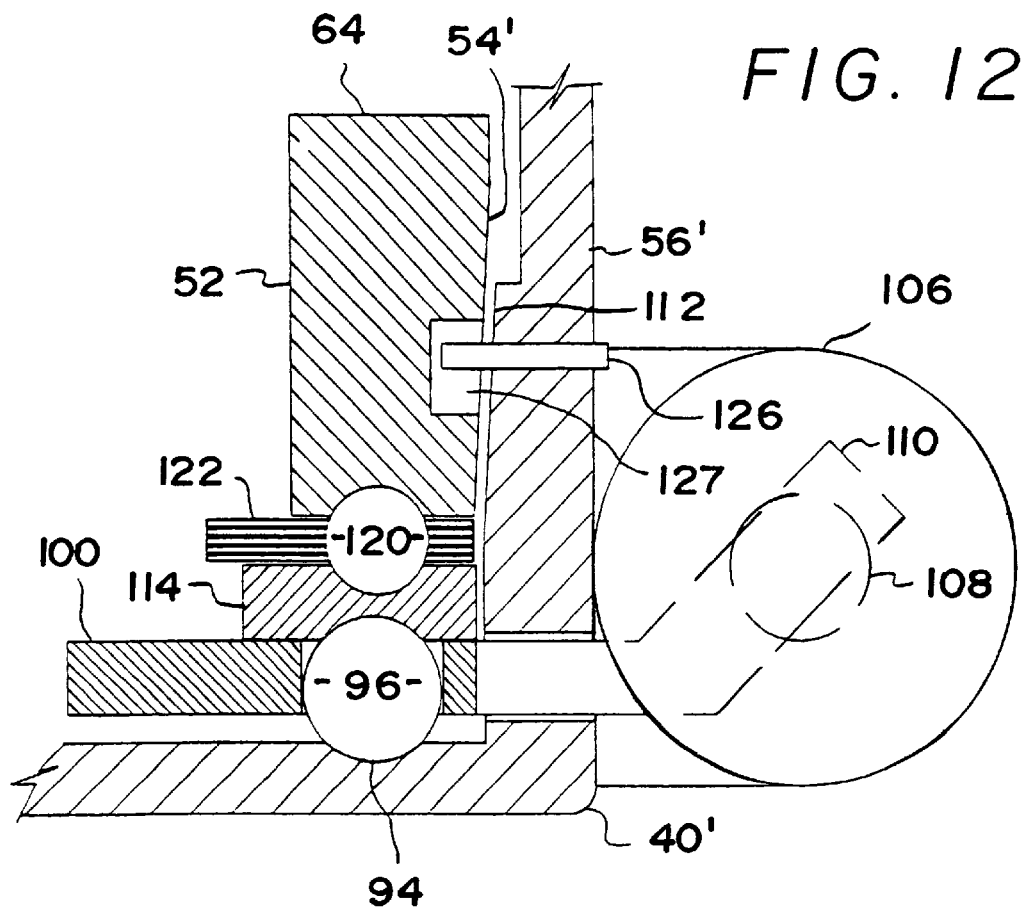
FIG. 12 is a fragmentary elevational view in partial section and enlarged to show in more detail remote trimming features of the modified embodiment of FIG. 7 when the trimming means has been actuated as in FIG. 11.
Figure 13:
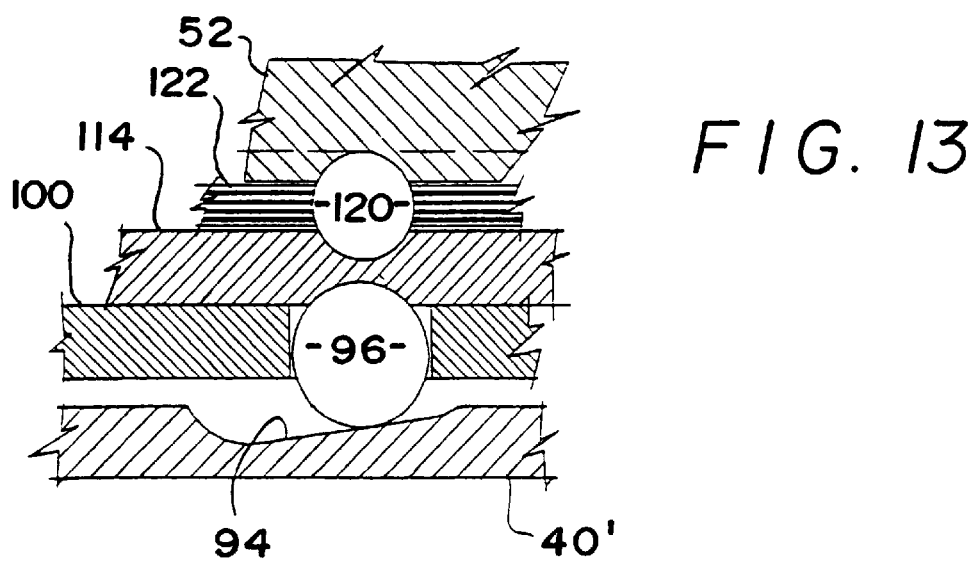
FIG. 13 is a fragmentary sectional view taken along line 13—13 of FIG. 11 and enlarged to show in more detail a release bearing ramp and a release bearing in its releasing position.

Referring now to FIGS. 12 and 13, the cam ring 52' is shown in its released condition where its outer conical face 54' is no longer in frictional contact with the inner conical surface 112 of housing wall 56'. This released condition is produced by introducing a pressurized fluid into a trim chamber 105 through an opening 107 in an end wall of trim cylinder 106. Such pressurization of the trim chamber 105 causes piston 104 to move from its position shown in FIG. 10 to its position shown in FIG. 11, which in turn causes the release plate 100 to drive release bearings 96 up their corresponding ramps 94, thereby axially moving (raising) track plate 114, ball bearings 120, spacer plate 122 and cam ring 52' relative to the housing wall 56' as shown in FIGS. 12 and 13.

This axial or raising movement disengages the outer conical face 54' of the cam ring from frictional engagement with housing wall surface 112, thereby freeing the cam ring for rotational movement relative to housing wall 56'. The amount of such rotational movement is limited by a pin 126, which is mounted on housing wall 56' and projects radially inward into an arcuate slot 127 in the outer periphery of cam ring 52'. Such rotational movement is produced by the return to center forces generated when the follower rollers are out of their centering depressions and are traveling on either the shoulders 66 or the shoulders 67 of the cam surface 64. Thus, cam ring 52' will rotate until the follower rollers return to their fully seated positions in their corresponding centering depressions, or until the pin 126 abuts against an end 128 or 129 of the slot 127 (FIG. 6). Upon deactivation of the trimming assembly by release of pressure from trim chamber 105, the piston 104 is returned to the position shown in FIG. 10 by a coil spring 109. This reengages the outer conical face 54' with the housing wall surface 112 to fix the cam ring in a new static position corresponding to a new center position of the steering system.

Figure 14:
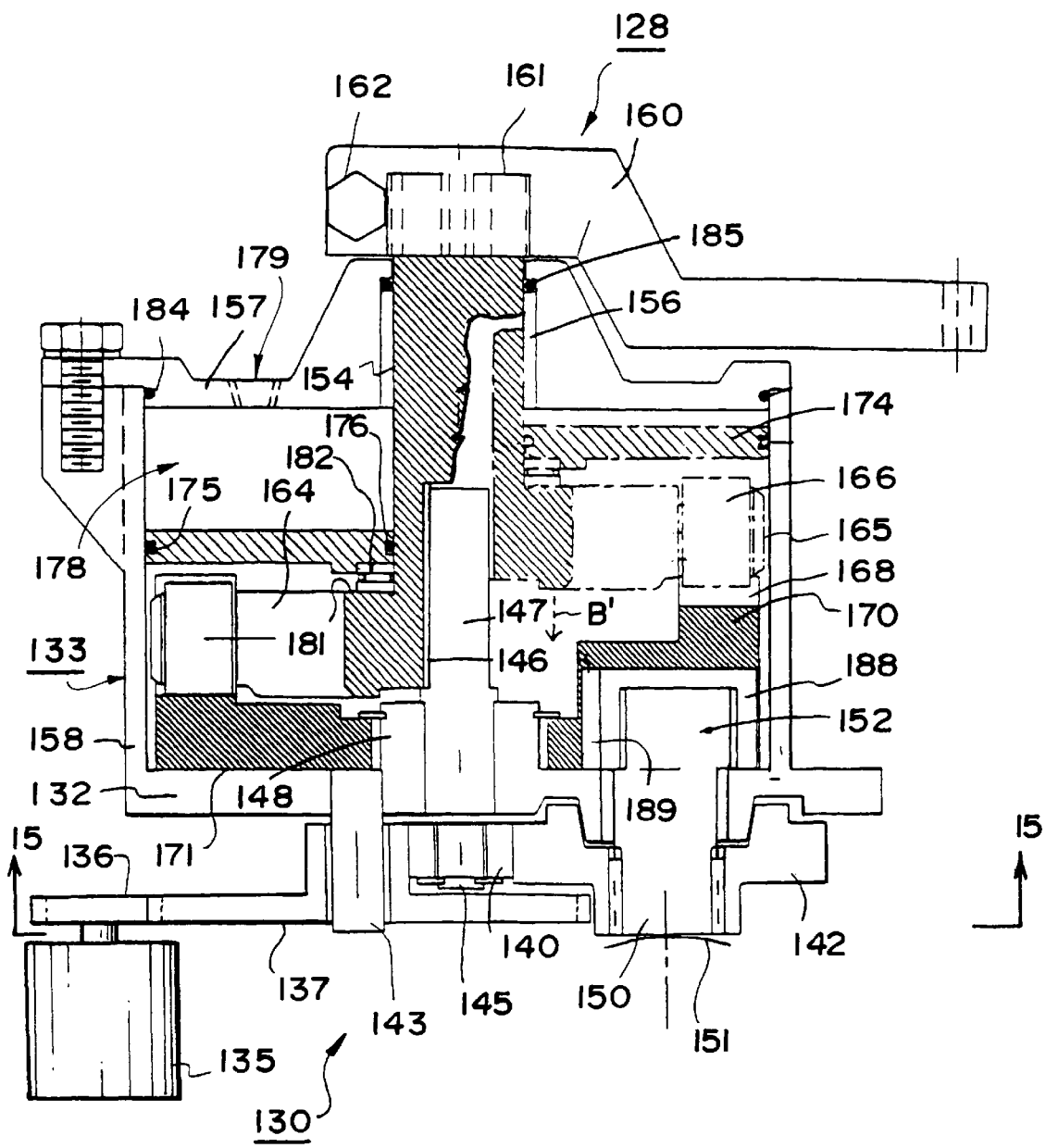
FIG. 14 is a side view in partial section similar to FIG. 7, but of a further modification of the invention having alternative remote trimming features.
Figure 15:
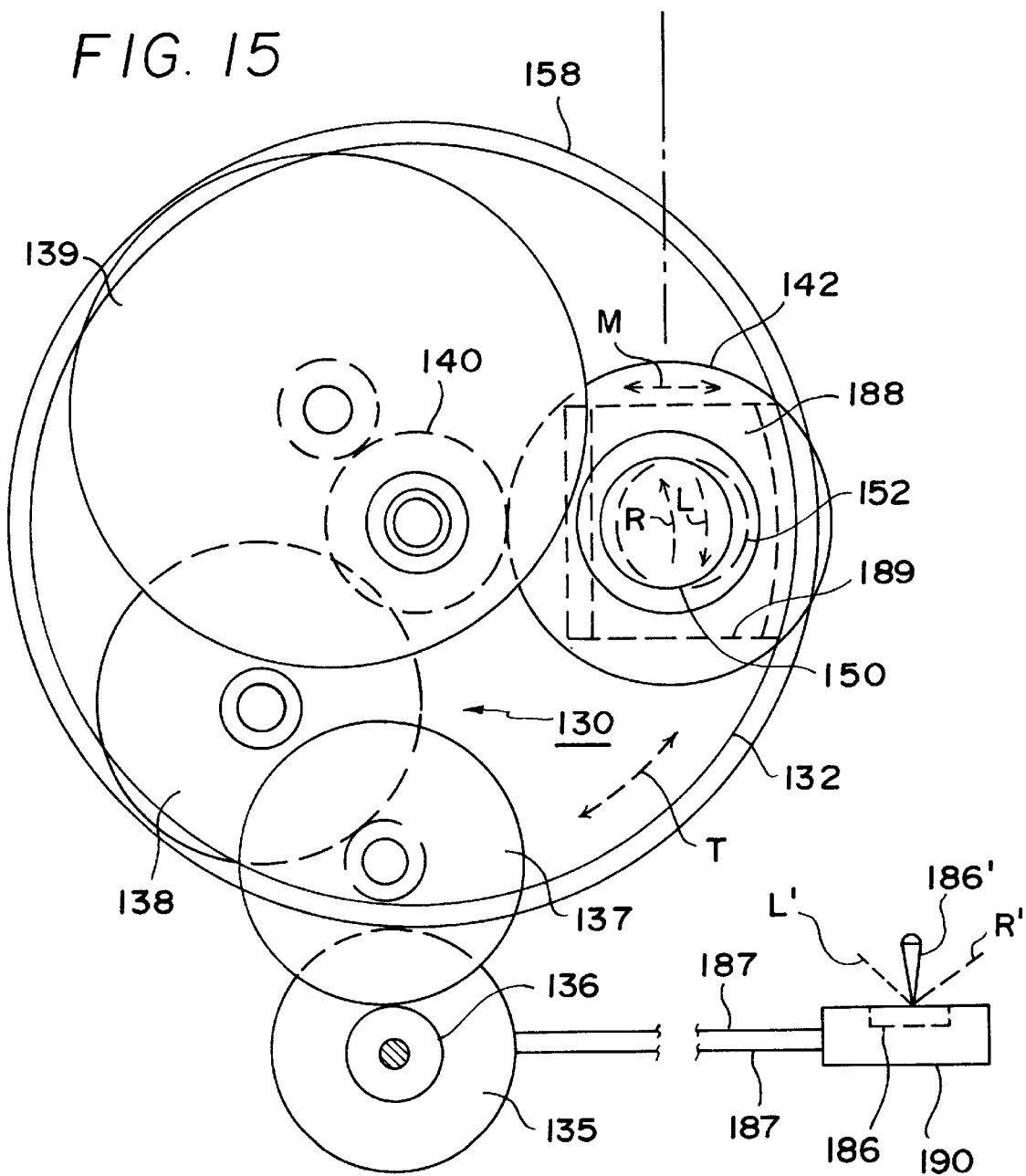
FIG. 15 is a sectional bottom view taken along lines 15—15 of FIG. 14.

Referring now to FIGS. 14 and 15, there is shown another embodiment of the invention having means for remotely trimming the center position of the steering compensator, and thereby the center position of the steering system to which it is connected. In the centering compensator 128 of this embodiment, a gear train, generally designated 130, is provided below the base 132 of the housing 133, and is driven by a reversible electric motor 135. The gear train 130 comprises a driving gear 136, spur gears 137, 138 and 139, an idler gear 140, and a driven gear 142. The gears 137, 138 and 139 are mounted on corresponding spindles, such as spindle 143 for rotatably mounting gear 137 as shown in FIG. 14. Idler gear 140 is rotatably mounted on a central spindle 145 formed as an extension of a central journal 147, which is mounted in housing base 132 by a bushing 148. The purpose of journal 147 is described further below. Driven gear 142 is keyed to a trimming shaft 150 so as to rotate this shaft along with an eccentric (off-center) journal 152, the purpose of which is also described further below. Shaft 150 is biased upward and held in the position shown in FIG. 14 by a leaf or coil spring 151 that is represented only diagrammatically.

Mounted for both sliding and rotational movement on the journal 147 is a hollow centering shaft 154, which is also mounted for both rotational and sliding movement by a bushing 156 in a lid 157 bolted to a cylindrical wall 158 of housing 133. The centering shaft 154 is rotated by a centering lever 160 extending transversely from the centering shaft and having a proximate end clamped to a splined distal end 161 of the centering shaft by a bolt 162. The distal end of lever 160 is connected to the steering system of the vehicle in the same manner as the centering lever 14 of the embodiment of FIGS. 3 and 4.

Extending laterally from the centering shaft 154 are three follower arms 164, only two of which may be seen in FIG. 14. At the distal end of each follower arm is a journal 165 carrying a cam follower member in the form of a roller 166 rotatably mounted on the journal 165. The respective rotational axis of the three follower rollers 166 are preferably spaced 120° apart in the same manner as the rollers 45, 46 and 47 of the embodiment of FIG. 7. The follower rollers 166 travel on a cam surface 168 of a cam ring 170, cam surface 168 having three centering depressions and other features essentially the same as the cam ring 52' shown in FIGS. 5 and 6. The inner edge 171 of cam ring 170 is supported for rotation on the base member 132 of the housing 133 and the outer edge of the cam ring defines the cam surface 168 that extends all the way around the periphery of this outer edge.

In order to keep the follower rollers in firm engagement at all times with the cam surface 168, centering shaft 154 is biased axially in the direction of arrow B' (downward relatively to the orientation of FIG. 14) by a piston 174 having an outer piston ring at 175 and an inner ring 176 and arranged for reciprocal movement along a central portion of centering shaft 154 so as to be responsive to the biasing force provided by a pressurized fluid supplied to a pressure chamber 178 through an opening 179 in the housing lid 157. The pressure chamber 178 is sealed with respect to ambient pressure by a ring seal 184 between the lid 157 and the housing wall 158, and a ring seal 185 between the housing lid 157 and the centering shaft 154. The piston 174 preferably engages an annular ledge 181 of centering shaft 154 via an annular thrust bearing 182. Such biasing of the centering shaft 154 provides the resistance force opposing movement of the follower rollers out of and away from their respective centering depressions, and also provides the return force which tends to return the follower rollers to their respective centering depressions when the rollers are travelling on the cam surface shoulders on opposite sides of the centering depressions.

In the embodiment of FIGS. 14 and 15, trimming of the selected center position of the steerable wheels is achieved by the interaction of a slide plate 188 with the walls of a slideway 189 located within the cam ring 170 and accessible from the inner edge 171 of the cam ring. The slide plate 188 is moved in response to movement of the eccentric journal 152 as actuated by the reversible electric motor 135 acting through the gear train 130, these components constituting a drive means for reciprocating the cam ring 170 relative to the housing wall 158.

Figure 16:
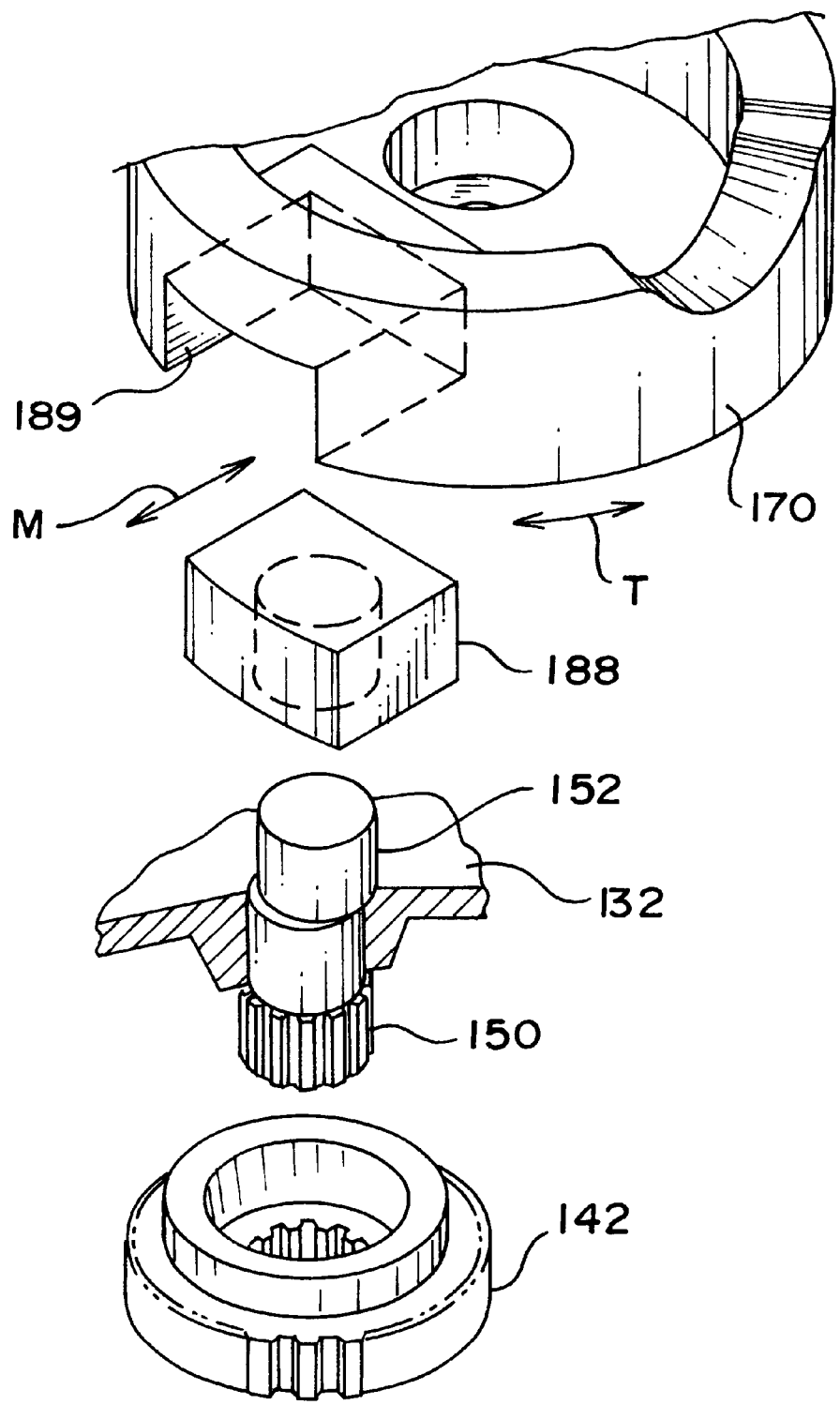
FIG. 16 is an exploded fragmentary view showing details of several of the components of the modification of FIGS. 14 and 15.

In other words, movement of the eccentric journal 152 in the respective arcuate directions indicated by the arcuate arrows R and L in FIG. 15 causes the engaged slide plate 188 to rotate the cam ring 170 in clockwise and counter-clockwise directions, respectively, around its rotational axis as viewed from the lever 160. Because the axis of journal 152 is fixed eccentrically to the axis of shaft 150 and driven gear 142, rotation of shaft 150 by the gear train causes a corresponding lateral shift of the axis of the offset journal 152, which in turn moves the cam ring 170 rotationally in corresponding directions, as represented by the double-ended arrow T. Such lateral shifts in the axis of journal 152 also cause radial shifts of the slide plate 188 in slideway 189 as represented by the double-ended arrow M. The structural details of these components are illustrated best in FIG. 16.

A conventional three position toggle switch serves as a trim switch 186 on a control panel 190, which is mounted at the driver station of a vehicle and is connected to trimming motor 135 by a pair of electrical lines 187, 187. Switch 186 preferably has a toggle 186' which is spring biased into a center, normally off position from a right position R' for driving journal 152 in the direction of arrow R, and a left position L' for driving journal 152 in the direction of arrow L (FIG. 15).

Therefore, upon selective actuation of switch 190 from its off position to its right position, reversible electric motor 135 is activated to drive eccentric journal 152 in the direction of arrow R, thereby causing clockwise rotation of the cam ring 170. Similarly, upon selective actuation of switch 190 from its off position to its left position, reversible electric motor 135 is activated to drive eccentric journal 152 in the direction of arrow L, thereby causing cam ring 170 to rotate in the counter-clockwise direction.

With the centering unit 128 mounted on the rear side of frame member 9 in place of centering unit 8 as shown in FIG. 1, the front wheels 26, 26 are trimmed toward a right turning movement of the vehicle by temporarily holding the trimming switch 186 in its right position R' and thereby causing clockwise rotation of cam ring 170 and trimming lever 160, centering unit 128 having the same orientation as trimming unit 8 in FIG. 2. The front wheels 26, 26 are trimmed toward a left turning movement of the vehicle by temporarily holding trimming switch 186 in its left position L' and thereby causing counter-clockwise rotation of cam ring 170 and trimming lever 160. When the desired course correction has been achieved by such actuation of switch 186, the switch toggle 187' is released and moves to its center off position in response to its spring bias.

Figure 17:
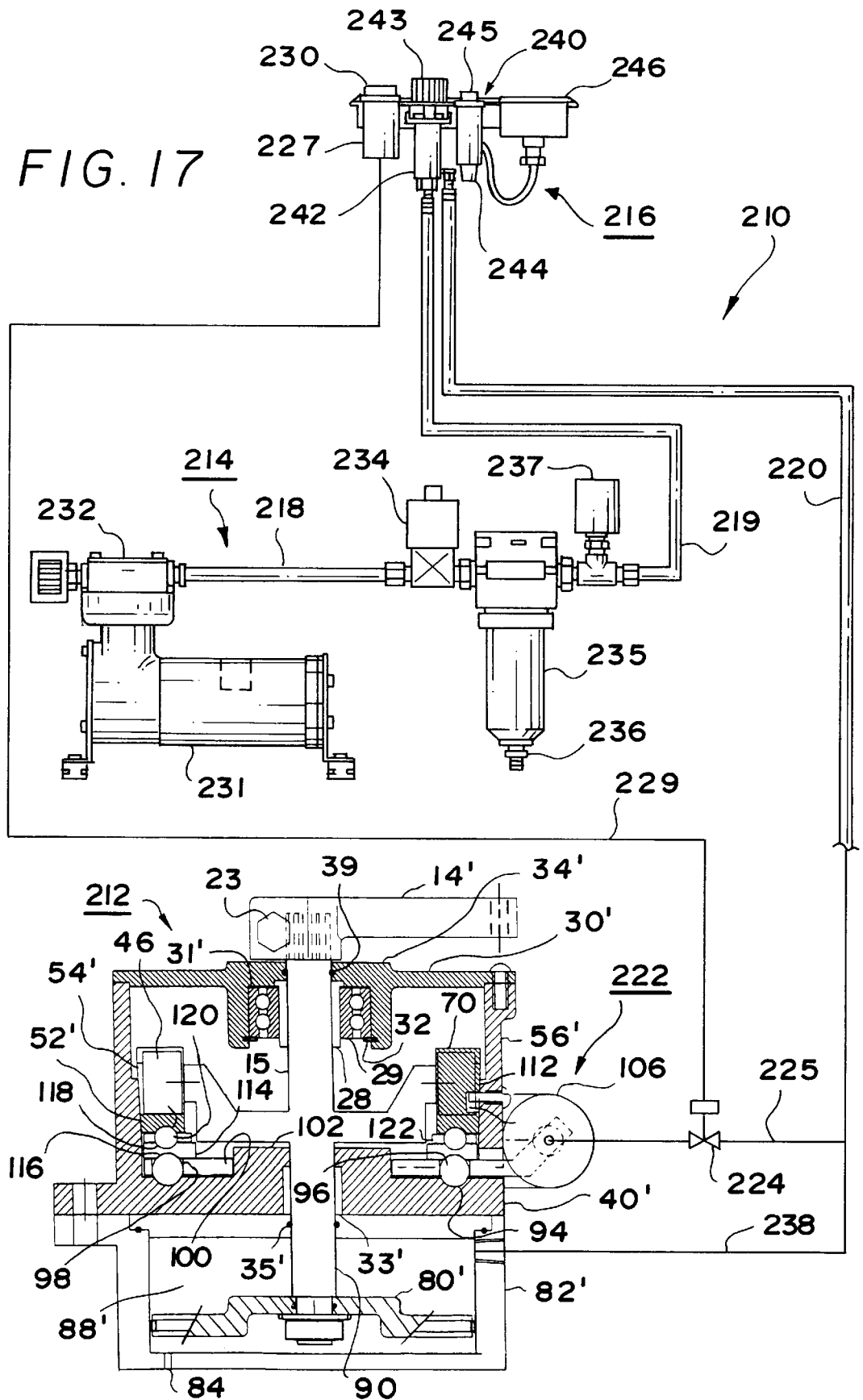
FIG. 17 is a schematic diagram of the fluid and electrical systems for operating the remotely trimmable embodiment of FIG. 7.

Referring now to FIG. 17, a centering system 210 utilizing the modified compensator of FIGS. 7–13 may comprise the centering assembly 212, to which pressurized air is supplied from an air supply assembly 214 via a control assembly 216, these assemblies being interconnected by appropriately sized air lines 218, 219 and 220. The centering system 210 also includes the trim assembly 222 connected to the centering assembly 212.

The trim assembly 222 includes a solenoid operated air valve 224 in a trim cylinder air line 225 and the solenoid of this valve is connected to a trim switch 227 in the control assembly 216 by an electrical line 229. The trim switch 227 includes a trim button 230 on a control panel 240, which preferably is located at or near the driver's station of the vehicle. The trim button 230 actuates an electrical switch of a toggle design that is spring-biased to a circuit-open position. Such switches are closed only momentarily when the toggle is held in a depressed position against the spring bias. Thus, the trim adjusting piston 104 is actuated only while the toggle is depressed by the button 230. Release of the button 230 opens a circuit and stops the trim adjustment at the point selected. Also mounted on the control panel 240 is an air pressure regulator 242 having a manual adjustment knob 243, an on/off power switch 244 having a push button 245, and an air pressure gauge 246.

Pressurized air is supplied to the air pressure regulator 242 by the air supply assembly 214, which comprises an air compressor 231, an intake and discharge manifold 232, a solenoid actuated dump valve 234 for depressurizing the air supply assembly, an air filter and dryer unit 235 having a moisture drain valve 236, and an adjustable pressure actuated cut-off switch 237 for cutting the air compressor on and off depending the desired output pressure. Air pressure above that desired for operating the centering assembly is supplied from air supply assembly 214 to regulator 242 by the air line 219, and then the desired regulated air pressure is supplied to the centering assembly 212 via the regulated air supply line 220 which supplies two branch air lines 225 and 238. Branch line 238 supplies pressurized air to the centering chamber 88', and branch line 225 supplies pressurized air to the trim chamber 105.

This embodiment of the invention thus includes means to remotely "trim" the center position of the steering system, and thereby the center of the steerable front wheels of the vehicle, in order to compensate for changes in extraneous steering forces that would otherwise cause the vehicle to drift off of its straight ahead course, unless opposed by driver manipulation of the steering wheel. For example, if there is a roadway pull to the right, straight ahead travel will require a compensating steering force to the left from the steering column to provide straight ahead travel of the vehicle. Trimming is accomplished by the remotely controlled trim assembly 222, which operates as follows.

While holding the steering wheel to the left in a position giving straight ahead travel, the trim button 230 is pushed momentarily to briefly operate the trim piston and release the cam ring clutch so that the cam ring will rotate into alignment with a new centering position. When the trim button is released, the clutch reengages with the cam followers in their center positions in the cam ring depressions such that the steering wheel will remain in a new "trimmed" position when released by the driver. In other words, the new on-center positions of the cam followers will then maintain the vehicle steering system in a newly centered condition, which provides straight ahead travel of the vehicle that is free from the previously experienced roadway pull to the right and will be maintained even when the steering wheel is released.

Figure 18:
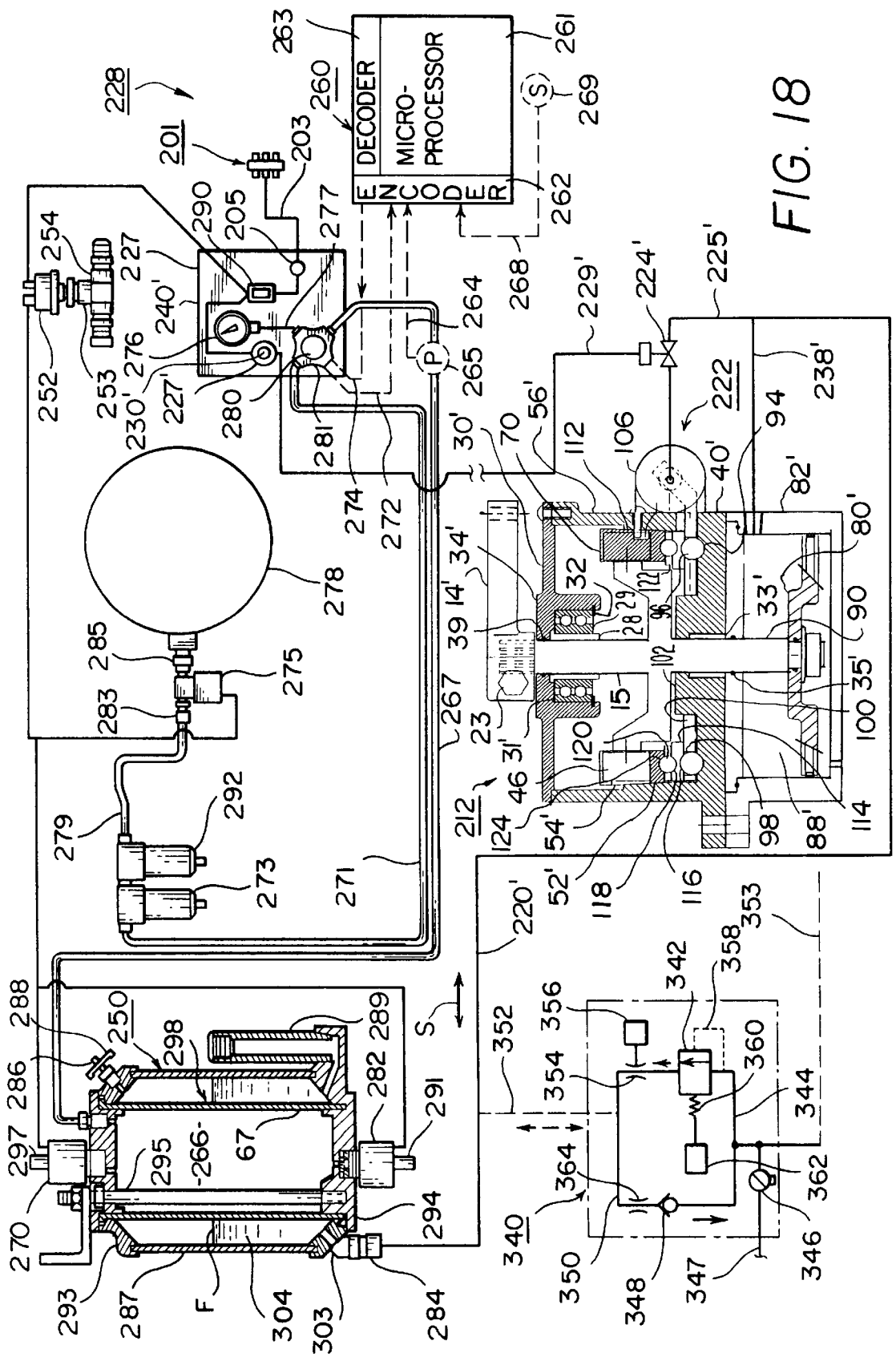
FIG. 18 is a schematic diagram of a modification of the fluid and electrical systems for operating the remotely trimmable embodiment of FIG. 7.

A further modification of the invention is illustrated in FIG. 18 wherein an accumulator 250 is used to provide a pressurized liquid to the pressure chamber 88' of the centering assembly 212 via a supply line 220' and a branch line 238', both capable of two-way flow as indicated by arrow S. The accumulator 250 has an annular liquid chamber 304, a central gas chamber 266 separated from the liquid chamber by a flexible bladder 267, and solenoid operated upper and lower gas dump valves 270 and 282. A liquid fluid may be desirable in some applications because it is substantially incompressible as compared to a gaseous fluid and therefore provides the capability of providing greater resistance to turning movements of the steering wheel.

The centering system of FIG. 18 also includes the trim assembly 222 connected to the centering assembly 212 as previously described. The trim actuator for operating the trim assembly 222 includes a solenoid operated stop valve 224' in a trim cylinder liquid line 225' and the solenoid of this valve is connected to a trim switch 227' of the control assembly 228 by an electrical line 229'. The trim switch 227' includes a trim button 230' on a control panel 240', which preferably is located at or near the driver's station of the vehicle. The trim button 230' actuates an electrical switch of a toggle design that is spring-biased to a circuit-open position in the same manner as switch 227 described above.

Bladder 267 is preferably made of neoprene. Accumulator 250 also includes an upper head 293 and a lower head 294 spaced apart by an outer housing wall 287 and secured together by peripherally spaced bolts 295, only one of which is shown in FIG. 18. Gas chamber 266 is connected to a compressed gas source 278 via a conduit 267, a pressure regulator 281, a conduit 271, a dryer 273, a particle filter 292, a conduit 279, a check valve 283, a solenoid operated cut-off valve 275, and a restrictor orifice 285 for limiting the flow rate to regulator 281.

The gas pressure in chamber 266 is indicated by a pressure gauge 276 which is connected to pressure regulator 281 by a conduit 277. The gas is preferably air, and both the bladder 267 and the surrounding housing wall 287 of accumulator 250 are preferably cylindrical. The gas pressure source 278 may be a pressurized air source, such as an on-board compressor, a vehicle airbrake system or some other conventional air pressure source, and gas pressure is regulated by a control knob 280 on the driver control panel 227. The components of the control panel and of a computer 260 are parts of the compensator control assembly 228.

Gas chamber 266 should be large enough for liquid chamber 304 to receive the entire volume of liquid from chamber 88' without unduly collapsing bladder 267. A bleed passage 286 containing a normally closed vent cock 288 allows liquid chamber 304 to be partially filled with hydraulic fluid up to the level of the top of a filler neck 289.

Gas pressure in chamber 266 acts through bladder 267 to store fluid energy received from the hydraulic side of the system, and to maintain fluid pressure on the liquid side of the piston 80' until such time as the gas pressure is released to ambient atmosphere by actuation of dump valves 270 and/or 282 in response to turning off the system with an on-off switch 290. Switch 290 is connected to an electrical buss 201 by a line 203 containing a circuit breaker 205. The lower dump valve 282 includes a drain line 291 and has the dual purpose of discharging both gas and any liquid (such as condensed water) accumulating in gas chamber 266. A pressure relief valve (not shown) may communicate with the gas chamber side of the accumulator to provide an upper limit to the resistance and return forces that may be generated by piston 80'.

The air pressure in the accumulator 250 is automatically recharged each time the system is turned on, thereby eliminating a recharge maintenance function. The gas chamber 266 of pressure accumulator 250 is protected from moisture by the suitable air filters and/or dryers 273 and 292. On systems supplied by an air compressor, the discharge from the upper accumulator dump valve 270 may be routed to a compressor inlet filter (not shown) for providing a backflush function to keep this compressor filter clean.

As it is best to deactivate the centering assembly 212 in the event of a failure of the power steering system, a switch 252 for interrupting electrical power to solenoid valves 270, 282 and 275 may be provided for vehicles with power steering systems. Switch 252 is mounted on a pressure sensor 253 located in a hydraulic line 254 in fluid communication with the outlet of the power steering pump (not shown). A loss of pressure at the pump outlet causes switch 252 to open, thereby causing gas supply valve 275 to close and dump valves 270 and 272 to open for depressurizing gas chamber 266, which in turn depressurizes liquid chamber 304 and centering chamber 88' connected thereto. Vent lines 291 and 297 are each preferably of larger capacity than gas supply conduit 267 to ensure that gas chamber 266 will be depressurized even if gas supply valve 275 fails to close and either dump valve 270 or 282 fails to open with the opening of pressure switch 252.

Accumulator 250 also allows hydraulic pressure in the centering chamber 88' to be precisely varied over a relatively wide range because the gas trapped in gas chamber 266 provides a spring-like return force and this chamber may be sized such that the return force does not vary significantly with compressive piston movement. The gas pressure control may comprise a manual throttle valve (not shown) between conduits 271 and 267, in combination with the pressure gauge 276 to indicate accumulator pressure.

Alternatively, the pressure regulator 281 may be used for maintaining a manually selected system pressure. The control knob 280 is provided to permit varying the pressure settings of the regulator by hand. By varying the gas pressure in gas chamber 266 through adjusting pressure regulator 281, the break away resistance and the centering return force produced by the compensator of the invention can be increased or decreased as desired. The range of pressures available should be selected so that break away resistance can be varied from relatively low at low speeds to relatively high at high speeds.

After movement of the cam followers is initiated upon breakaway from their center positions, the steering force required to sustain movement is a function of the pressure in the accumulator 250, as well as of other centering phenomena acting on the steering system, such as positive wheel caster. Also after break away, accumulator pressure acting on the cam followers provides a return force that is effective over the entire range of turning angles, which for highway vehicles is usually limited to about 45° on either side of the center position (the 0° position) of the steerable front wheels.

As an alternative to manual adjustment, the output pressure of regulator 281 may be adjusted by a reversible electric motor (not shown) controlled by an on-board computer 260, which comprises a microprocessor 261, an encoder 262 and a decoder 263. Encoder 262 converts to digital signals an analog signal 264 input from a pressure sensor 265 in the gas supply conduit 267, an analog signal 268 input from a vehicle speed sensor 269, and an analog signal 272 input from a position sensor (not shown) within regulator 281. Decoder 263 converts digital control signals generated by microprocessor 261 to an analog signal 274 for controlling the reversible electric motor which adjusts the output pressure provided by regulator 281. The gas pressure in gas chamber 266 and the resulting resistance and centering forces are thereby made automatically responsive to the speed of the vehicle to provide "speed sensitive centering" of the vehicle's steering system. It may be desirable that the resistance to turning movements away from the center position be increased automatically as the speed of the vehicle increases because the effects of small off-center movements in response to spurious steering inputs increase dramatically with vehicle speed.

As an alternative to supplying the pressurized liquid directly from the accumulator inlet/outlet fitting 284 to the centering assembly 212 via the direct two-way flow line 220', an alternate centering fluid system 340 may be used to provide additional centering features. Thus, an additional level of resistance to be overcome before turning movement may be initiated is provided by a pressure differential valve 342 in a return conduit 344 also containing an orifice 354.

Although accumulator pressure alone will resist off-center movement of piston 80' in the absence of a pressure differential valve, this valve may be used so that the steering force required to make a turning movement away from center is substantially higher than the return force for returning the system to center upon removal of the steering force. Until pressure in the centering chamber 88' exceeds the setting of valve 342, movement of both pistons is prevented by fluid trapped in the centering chambers by this valve and check valve 348 in a one-way supply conduit 350. A solenoid operated dump valve 346, which may be actuated by switch 252, will release any residual centering chamber pressure through a drain line 347 in the event of a failure in the power steering system.

When the pressure setting of differential pressure valve 342 is reached, fluid then flows through conduit 344 and a conduit 352 into accumulator liquid chamber 304. Valve 342 is preferably of the spring biased type and dotted line 358 represents a pilot line through which centering chamber pressure is applied until it overcomes the force of a diaphragm spring 360 and opens the valve. The pressure setting of this valve can be varied by adjusting the spring tension, and the valve may include a remotely controlled solenoid 362 so that the pressure differential can be manually or automatically varied in accordance with vehicle speed.

The orifice 354 may be used to control the rate of fluid flow out of the centering chamber when valve 342 is open. Orifice 354 may be fixed or variable in size and in either case provides a flow resistance that varies in response to the rate of piston movement. If orifice 354 is of variable size, it may be operated by a remotely controlled solenoid 356 to make its flow restriction controllably variable in response to vehicle speed or to a manual selector. Orifice 354 may comprise a solenoid operated throttle valve or a multiported valve with different size outlet orifices. Both the orifice solenoid 356 and the valve solenoid 362 may be controlled automatically by the on-board computer 260 through the use of inputs and outputs similar to those already described for automatically controlling pressure regulator 281.

The pressurized hydraulic fluid available from the accumulator 250 is transmitted to the centering chamber 88' through the inlet/outlet conduit 352 and supply conduits 350 and 353. This accumulator energy provides the return force for reseating the cam followers in the centering depressions upon removal of intentional steering inputs. Should the rate of piston return to its centering position be too rapid and cause the steering system to overshoot its selected center position, an orifice 364 may also be installed in supply conduit 350 to control the rate of fluid flow into the centering chamber. However, such flow restrictions should not prevent a relatively free return of all components to center.

Although alternative fluid system 340 is optional, the differential pressure valve 342 is an important feature because it may provide improved centering stability and steering control. The steering force may vary within the range of resistance represented by valve 342 without generating any steering movement. This valve then opens at its set point and remains open as long as a pressure differential above the set point exists between pilot line 358 and conduit 352. It will therefore remain open while the centering piston is moving and will close when such movement stops because continued flow through orifice 354 will lower the pressure differential below the set point.

Thereafter, when the steering force drops below the opposing return force generated by accumulator pressure through supply conduit 350, the centering piston returns to its rest position as fluid flows from the accumulator through check valve 348. Differential pressure valve 342 in combination with accumulator 250 therefore provides a static resistance force greater than the dynamic resistance force provided by the accumulator alone. The term "static" is used in this specification to distinguish the variable resistance force provided by orifice 354 in response to the rate of fluid flow produced by movement of the centering piston. By comparison, the resistances provided by accumulator 250 and valve 342 are both present without fluid flow.

Referring now to FIGS. 19–22, there is shown a modified centering compensator 370 with a different piston arrangement for biasing the follower mechanism toward the cam ring, and a different trim mechanism for changing the static azimuthal position of the cam ring to change the center position of the steering system to which the compensator is connected by the pair of ball joints 21,21 and the connecting rod 18. In this embodiment, the centering level 14 is connected by a spline to a centering shaft 372 that is arranged for both rotational and sliding movement on a spindle 374 mounted in a boss 391 on a bottom wall 375 of the housing 371. As may be seen best in FIG. 21, extending laterally from centering shaft 372 are three follower arms 376, 377 and 378, only one of which may be seen in FIGS. 19 and 20.

At the end of each follower arm is a journal 380 carrying a cam follower member in the form of a roller 382 rotationally mounted on the distal end of the journal 382. The respective rotational axes of the three follower rollers are preferably spaced 120° apart, as in other embodiments above. The cam followers 382 travel on respective segments of a cam surface 384 having three centering depressions each with sloped shoulders in the same manner as cam ring 52 previously described. The cam surface 384 is provided on the top annular edge of a cam ring 386 having a bottom skirt 388 defining a brake-like drum in which is housed a trim mechanism as described further below.

Figure 19:
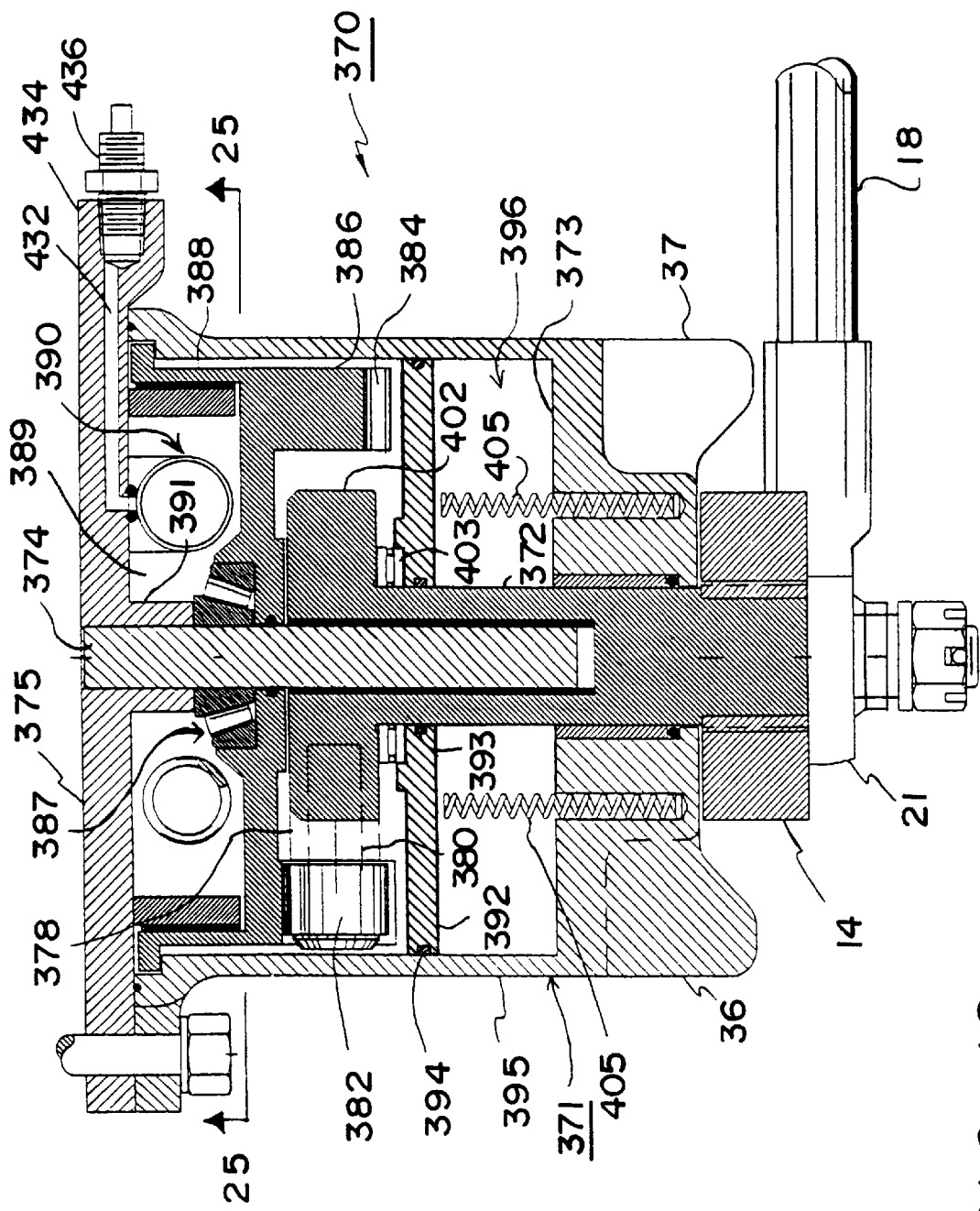
FIG. 19 is a sectional side view taken along line 19—19 of FIG. 27 and showing another modification of the invention with remote trimming features.
Figure 20:
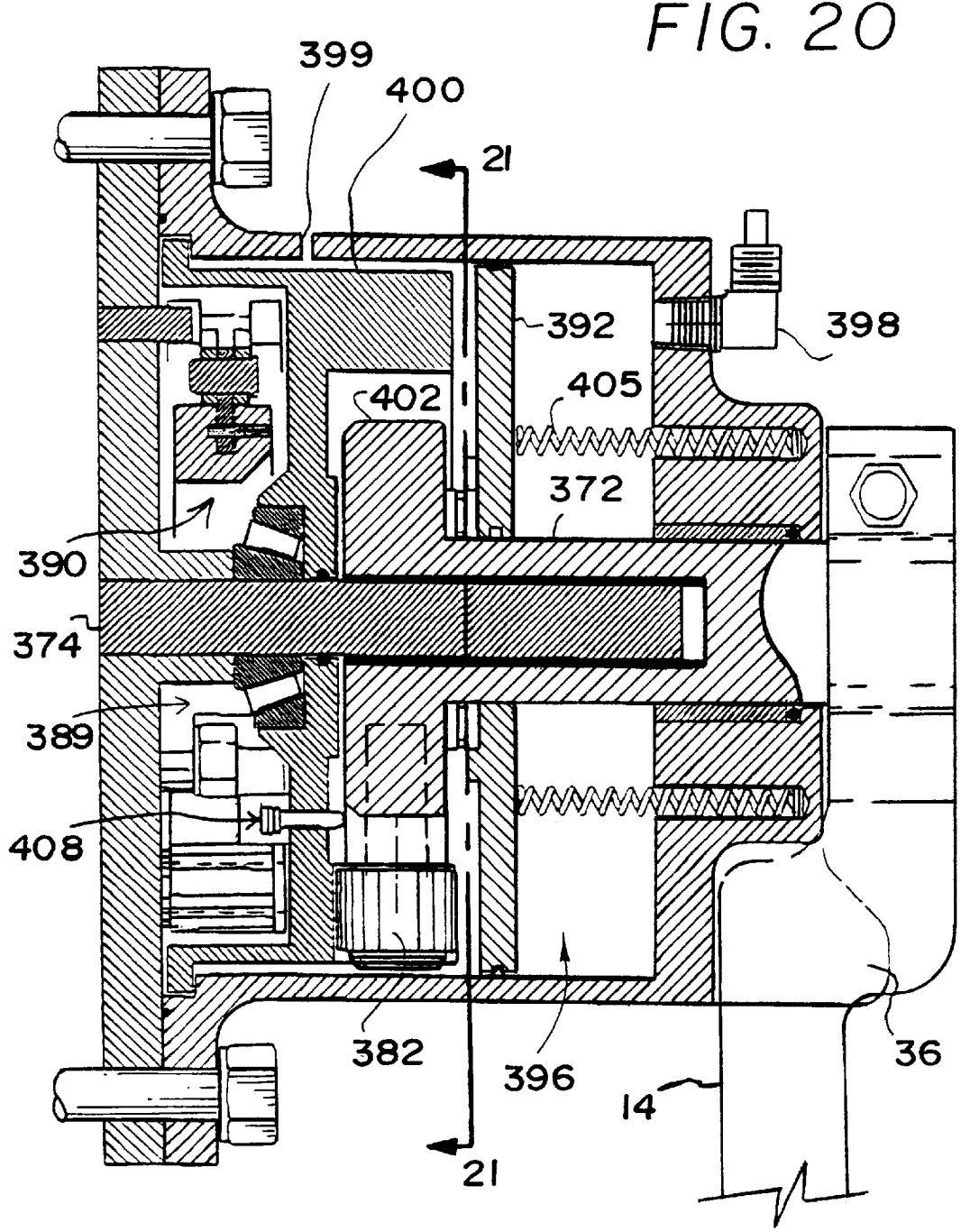
FIG. 20 is a sectional side view of the modified compensator of FIG. 19 taken along line 20—20 of FIG. 27.

As previously explained, the centering shaft 372 is mounted for both sliding and rotary movements relative to the housing 371. The purpose of these movements is to permit the follower rollers 382 to travel along their corresponding segments of the cam surface 384, which requires that the cam rollers move in both peripheral directions and in both axial directions in response to rotational and sliding movement of the centering shaft 372. In order to keep the follower rollers in firm engagement at all times with the cam surface 384, centering shaft 372 is biased axially in the direction of arrow B (upward relative to the orientation of FIG. 19) by a piston 392 having inner and outer piston rings 393 and 394 and arranged for reciprocal movements in a cylinder portion 395 of housing 371. The cylinder 395, piston 392 and top housing wall 373 define a centering chamber 396 which may be pressurized with a liquid or gaseous fluid through a nipple 398 (FIG. 20). An inner portion of cylinder 395 has a vent 399 for communicating an ambient air chamber 400 with ambient pressure.

Figure 24:
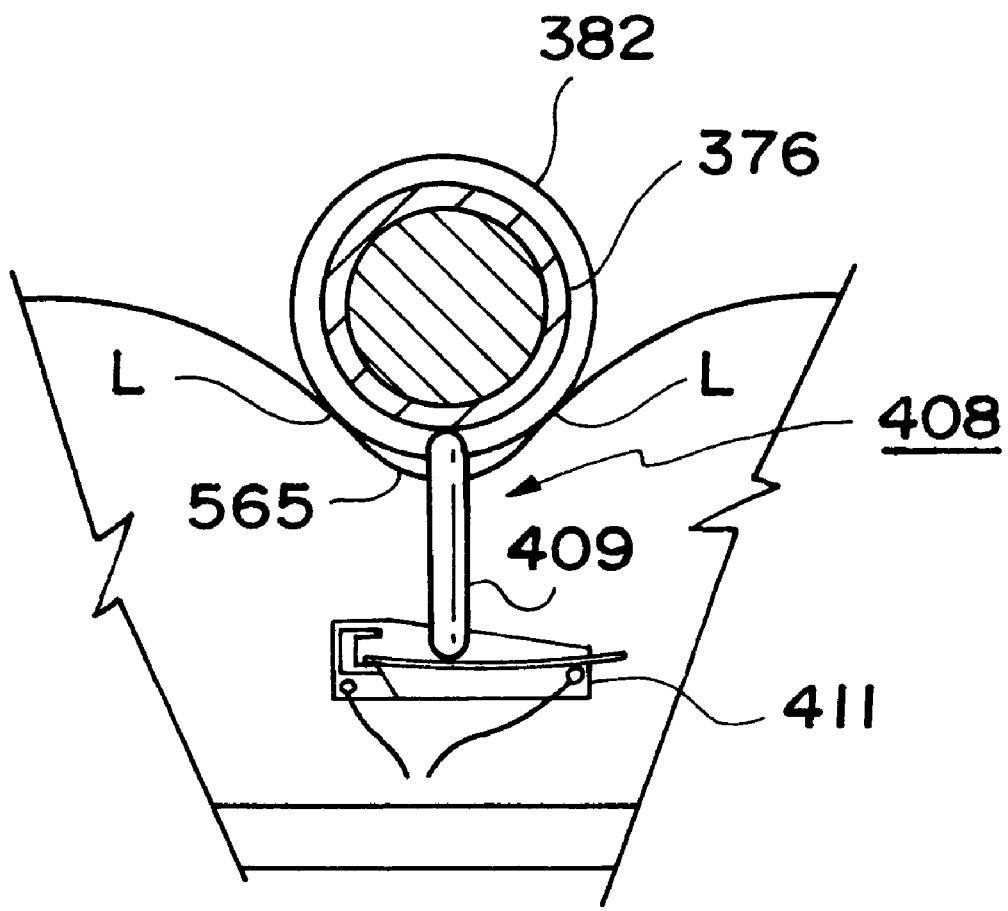
FIG. 24 is a fragmentary sectional view showing details of a switch component illustrated diagrammatically in FIG. 23.

Piston 392 engages central body 402 of the centering shaft through a thrust bearing 403, and is responsive to axial movement of the follower assembly while being biased by fluid pressure in centering chamber 396. As the follower rollers travel upward along the shoulders of the cam surface on either side of the centering depressions, the piston 392 undergoes compressive movement within the centering chamber 395 as illustrated in FIG. 24. The resilient force of the pressurized fluid opposing compressive movement of the piston may be supplemented by one or more coil springs 405,405 as shown in FIGS. 19 and 24. As necessary for such compressive movement, ambient air flows through vent 399 into chamber 400, which is on the opposite side of piston 392 from centering chamber 396. Such biasing of the centering shaft 372 and the follower assembler mounted thereon provides a resistance force opposing movement of the follower rollers out of and away from their respective centering depressions, and also provides a return force which tends to return the follower rollers to their respective centering depressions during steering system movements away from center.

Figure 21:
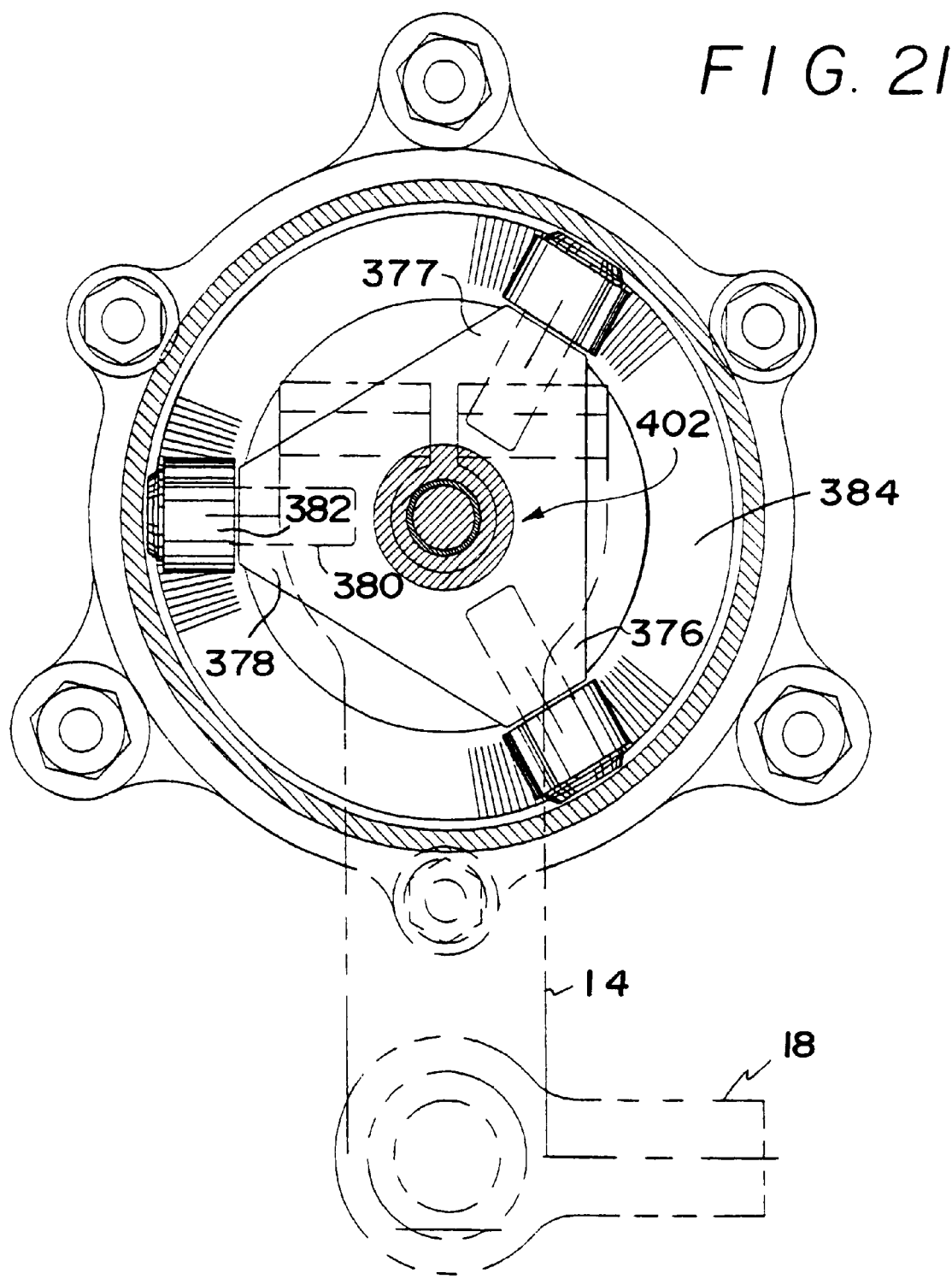
FIG. 21 is a top view of the modified compensator of FIG. 19 taken along line 21—21 of FIG. 20.
Figure 22:
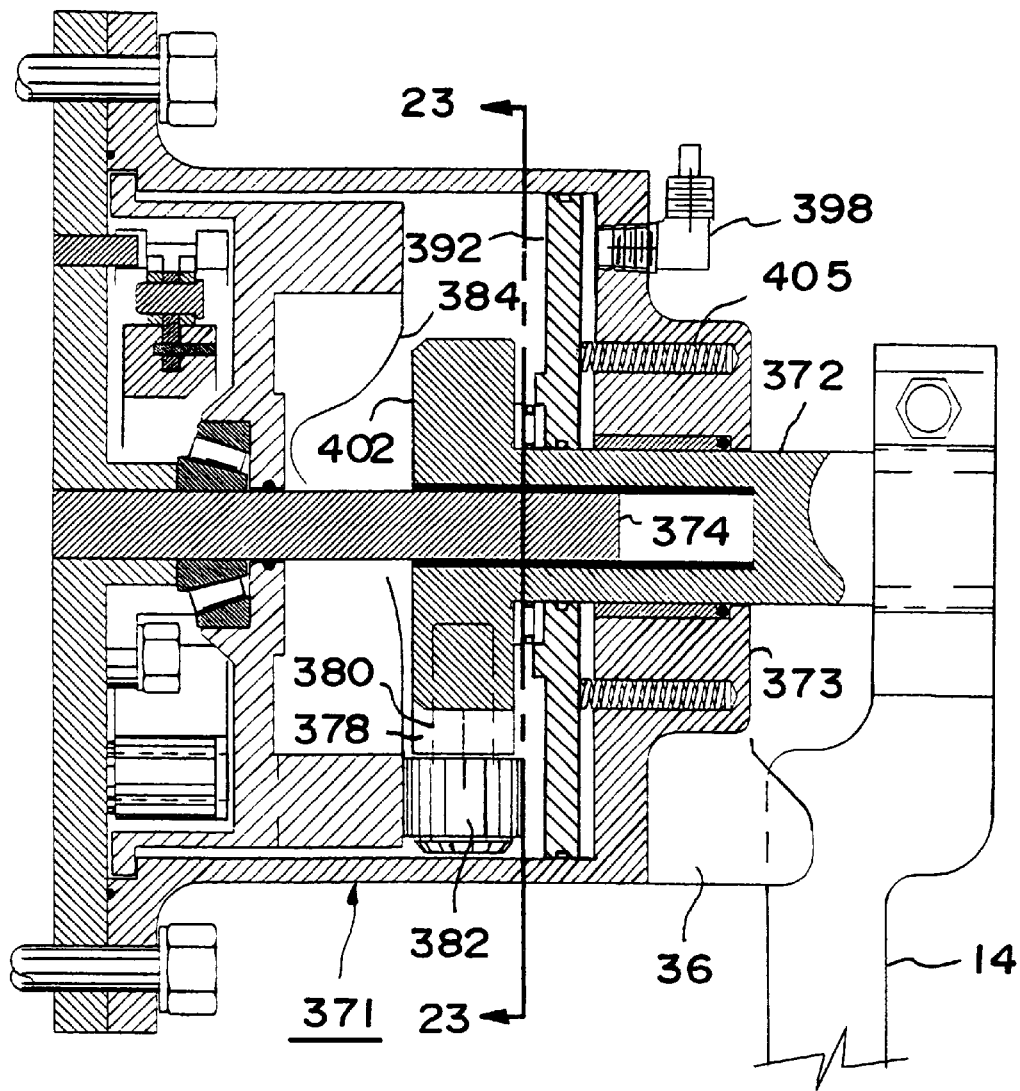
FIG. 22 is a fragmentary sectional side view of the modified compensator of FIG. 19 taken along line 22—22 of FIG. 28.
Figure 23:
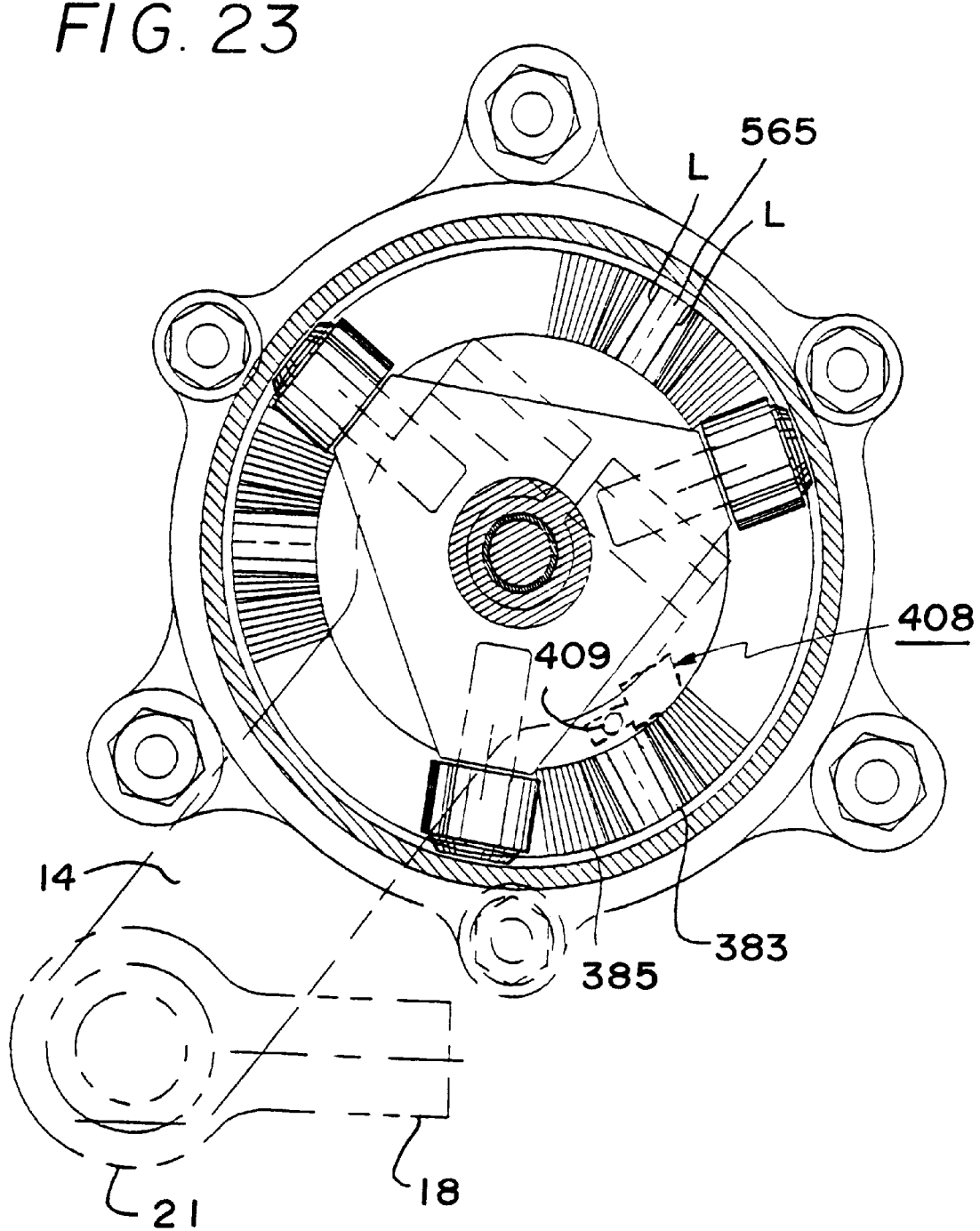
FIG. 23 is a sectional top view of the modified compensator of FIG. 19 taken along line 23—23 of FIG. 22.

FIG. 21 is a top sectional view showing the follower rollers centered in the centering depressions of the cam surface 384, and this center position corresponds to that shown from the side in FIGS. 19 and 20. In FIGS. 22 and 23, the follower rollers 382 have moved away from the centering depressions 383 during an away from center movement of the steering system, and are shown resting on a sloped shoulder 385, one of which is on either side of the centering depressions 383. The away from center position of the follower rollers as shown from the top in FIG. 23 corresponds to the away from center position shown from the side in FIG. 22.

In FIGS. 20, 23 and 24, there is also illustrated an optional sensing device 408 for providing a signal that may be shown on a display (not shown) at the driver station of a vehicle to provide an indication at all times when the follower rollers are away from their center position within the centering depressions 383. Sensing device 408 includes a probe 409 that is biased upward and arranged for downward sliding movement when contacted by follower arm 376 so as to close the electrical contact of a switch 411.

Figure 25:
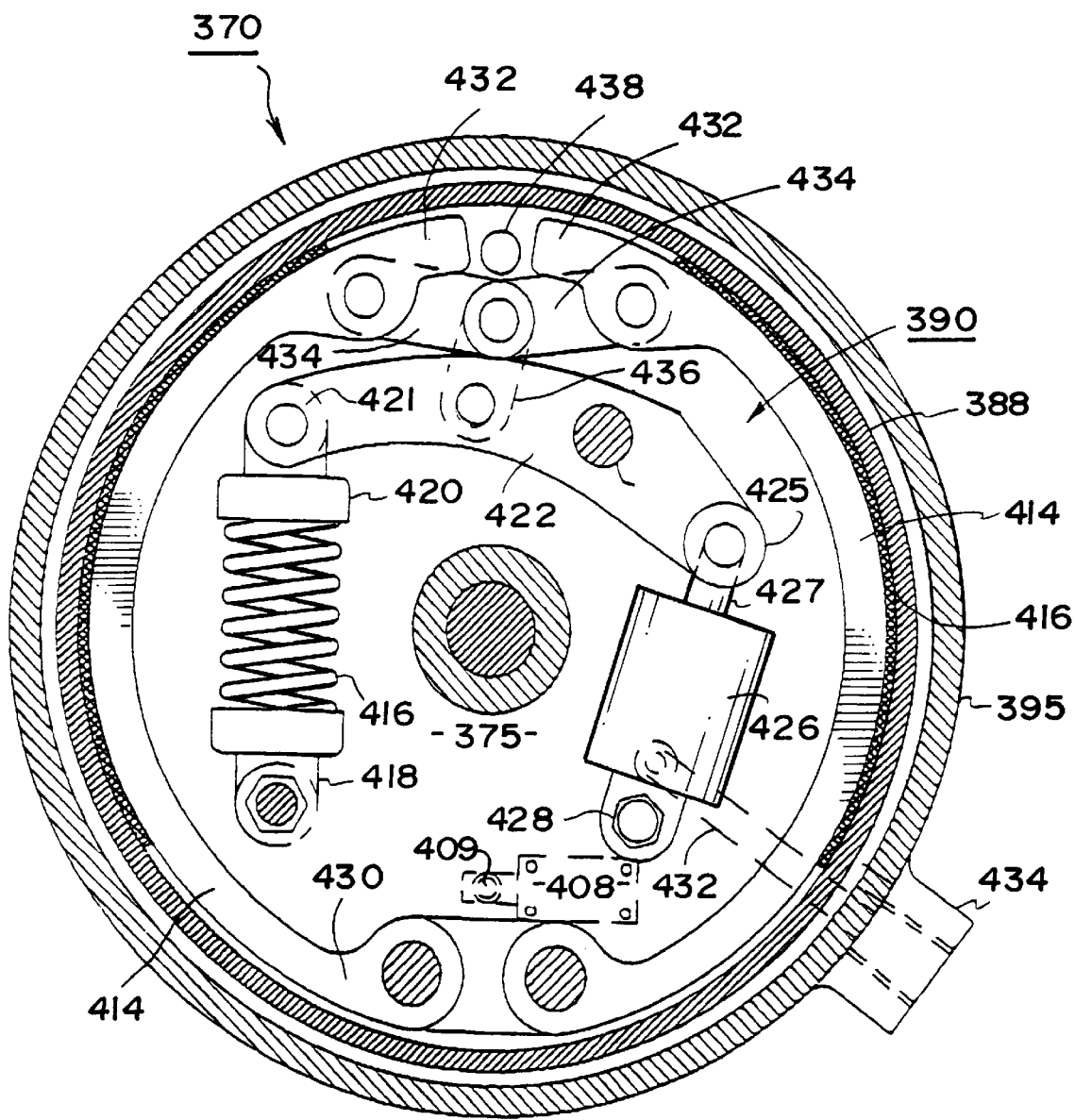
FIG. 25 is a sectional top view taken along line 25—25 of FIG. 19, and showing components of the trim system in their engaged positions.
Figure 26:
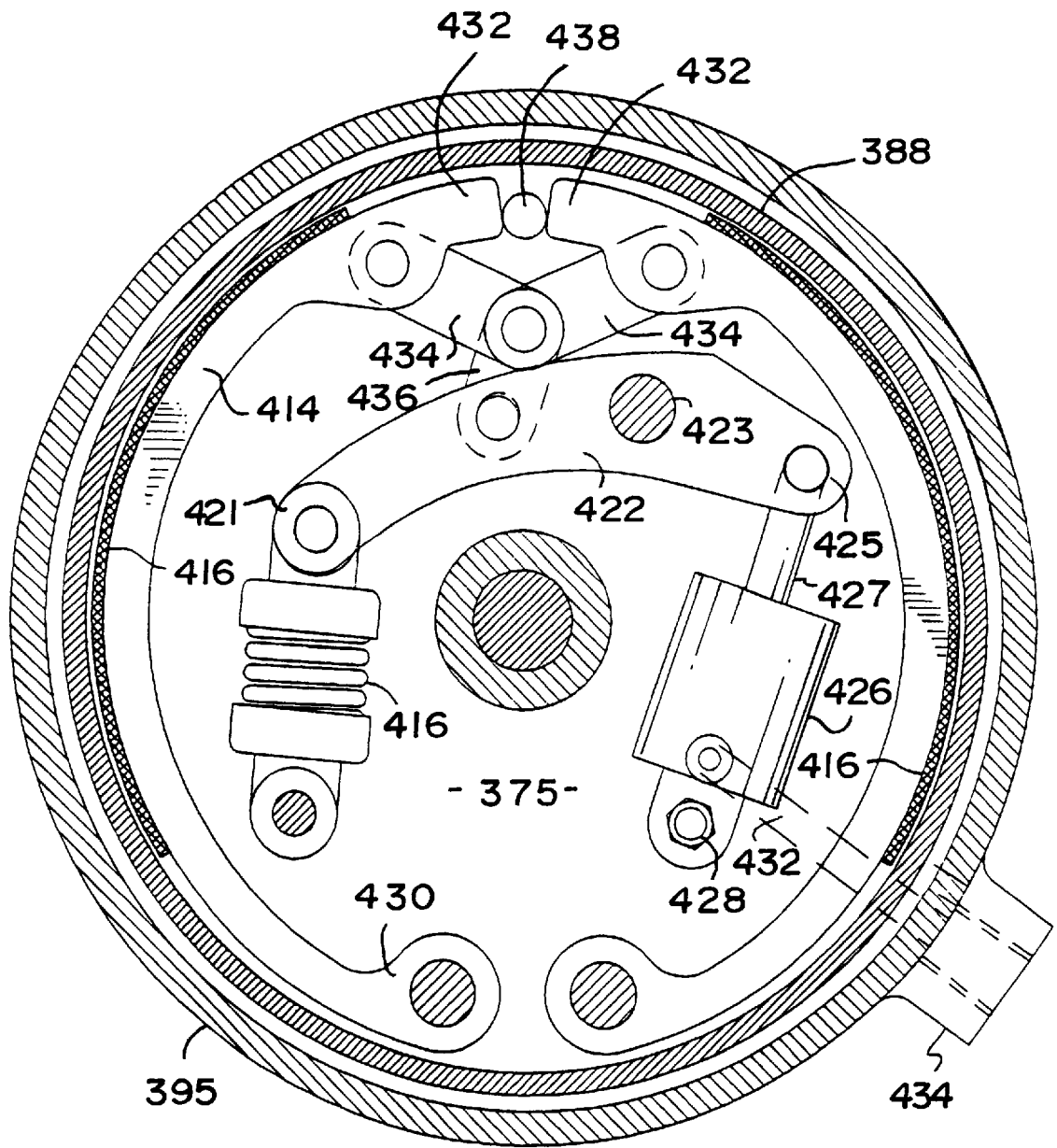
FIG. 26 is a sectional top view similar to FIG. 25, but showing the trim system components in their disengaged positions.

Referring now to FIGS. 25 and 26, there is shown another embodiment of the invention wherein means is provided for remotely changing or trimming the center position of the steering compensator, and thereby the center position of the steering system to which it is connected. As previously indicated, the inner skirt of cam ring 386 serves as a brake drum 388. Radially inward from the brake drum 388 is a remote trimming mechanism, generally designated 390, housed in a trim compartment 389. Mechanism 390 comprises a pair of brake shoes 414,414 each having a brake pad 416 made of a high friction and temperature resistant material, such as that used on the brake shoes of automobiles. A brake engaging spring 417 is pivotally mounted at its base 418 to the bottom wall 375 of housing 371, and is pivotally connected at its distal end 420 to one end 421 of a rocker arm 422 pivotally mounted on bottom wall 375 by a pin 423. The opposite end 425 of rocker arm 422 is pivotally connected to a piston 427 arranged to reciprocate in a cylinder 426, which in turn is pivotally mounted at 428 on bottom wall 375.

The proximate end 430 of each brake shoe is also pivotally mounted to the bottom housing wall 375, and the distal end 432 of each brake shoe is pivotally connected to a link 434 that is pivotally connected both to a link 434 of the other brake shoe and to the rocker arm 422 via an intermediate pivotal link 436. A stop pin 438 is positioned half way between the opposing distal ends 432,432 of the brake shoes 414,414 as shown in FIG. 25.

Figure 27:
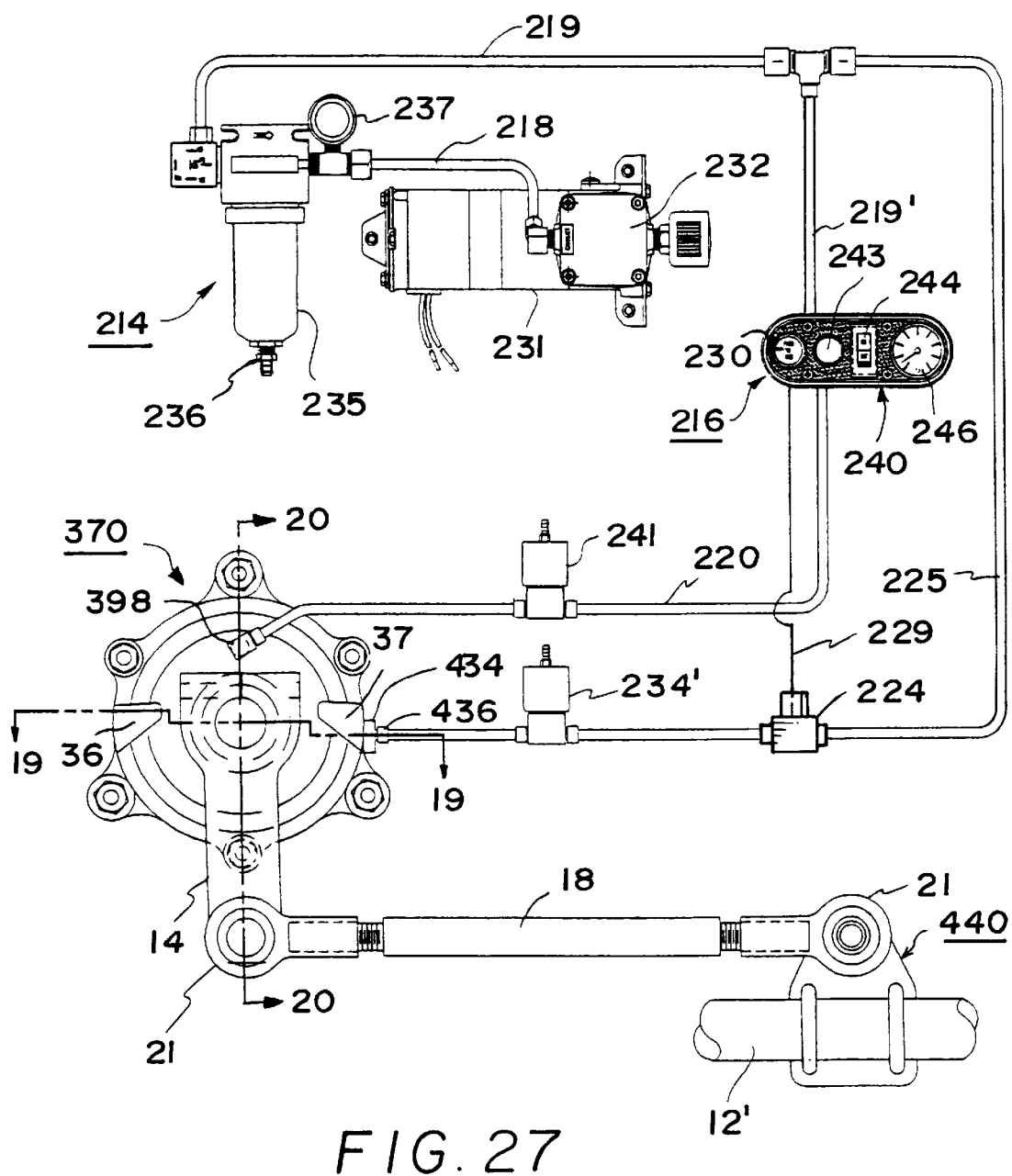
FIG. 27 is a schematic diagram of the fluid systems for operating the remotely trimmable embodiment of FIGS. 19–26.

When the cam ring 386 is to be trimmed, a pressurized fluid, such as air, is supplied to the trim cylinder 426 via a fluid passage 432 having an external port 434 attached to a fluid system via a nipple 436 (FIGS. 19 and 27). Pressurization of the cylinder 426 causes extension of the piston 427 and a corresponding release motion of the rocker arm 422, which compresses the coil spring 417 and acts through pivotal links 436 and 434 to pull the brake shoe pads 416 away from the brake drum 388 as shown in FIG. 26. The extent to which the brake pads are pulled away from the drum 388 is limited by abutment of the distal brake shoe ends 432,432 against the stop pin 438.

Upon such disengagement of the brake pads from the brake drum, the cam ring 386 is free to move with the follower rollers as they rest in their centering depressions so that there may be a change in the center position of the steering system as provided by the steering compensator in accordance with the principles previously described. Cam ring 386 is rotatably mounted for such trimming adjustments by a roller bearing assembly 387 supported on the boss 391, which also supports the spindle 374 on the bottom housing wall 375 (FIGS. 19 and 20).

FIG. 27 is a schematic diagram of a fluid system for operating the remotely trimmable embodiment of FIGS. 19–26. Except for a different connection of the trimming system to the fluid system, the system for operating the centering compensator 370 is essentially the same as the fluid system shown in FIG. 17 for operating the compensator 212. Accordingly, the same numerical designations have been used for the same components, and those components will not be described further here. Two differences are that two downstream over-pressure dump valves 234' and 241 are used in place of the upstream over-pressure dump valve 234 of FIG. 17, and the centering lever 14 is attached directly to a drag link 12' by a bracket and clamp 440, the connecting rod 18 and the respective ball joints 21,21. Instead of being connected to the tie rod 11, drag link 12' is connected directly to one of the bell cranks 22 as is well known in the art. In addition, there is a pressure switch 237 for cycling compressor operation to maintain a predetermined level of pressurized air in the fluid systems.

Figure 28:
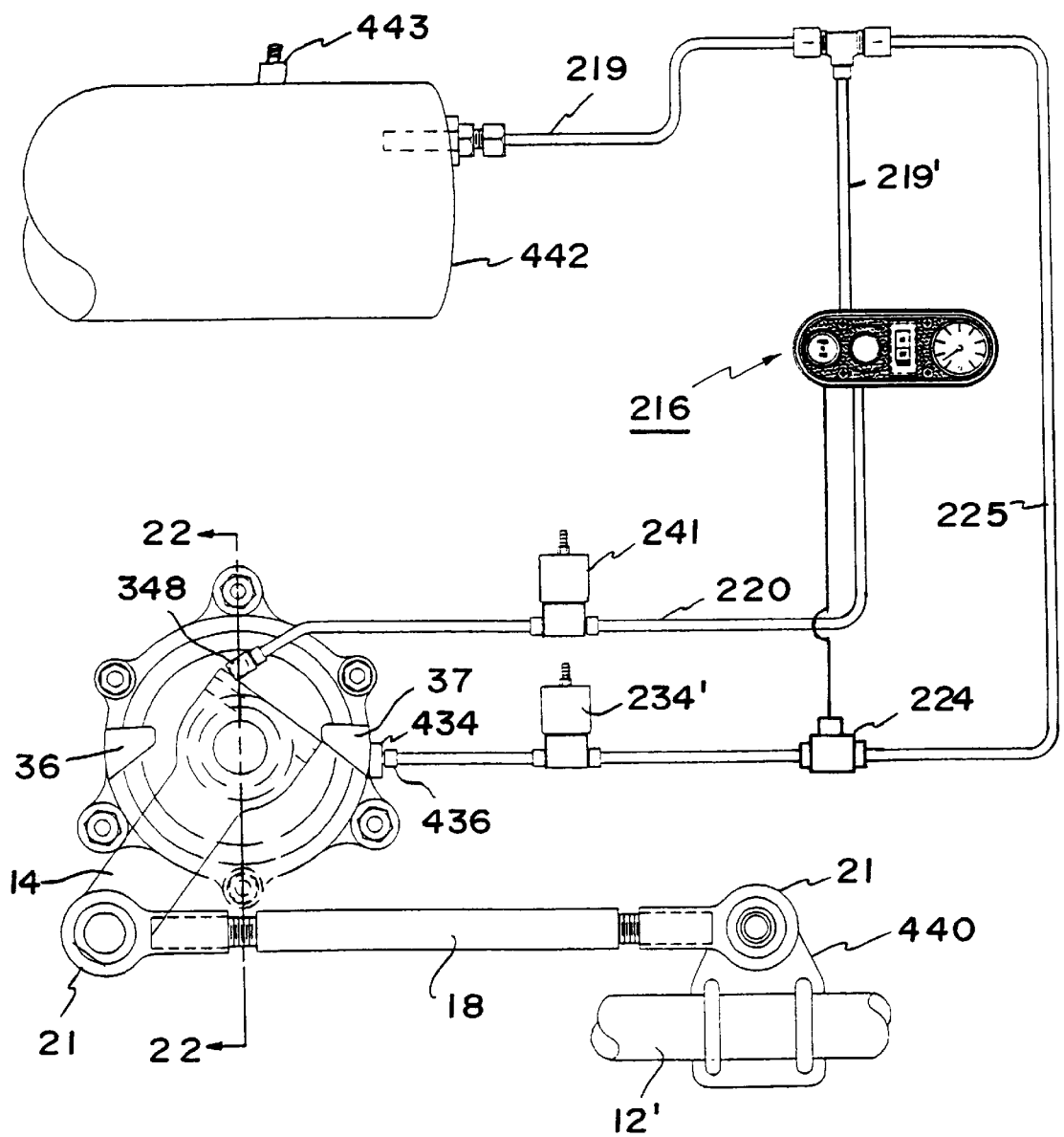
FIG. 28 is a schematic diagram of a modified fluid system for operating the remotely trimmable embodiment of FIGS. 19–26, and shows this embodiment with the steering system moved away from its center position.

An alternative method of providing pressurized air is shown in FIG. 28 wherein an air storage tank 442 may be filled through a check valve 443 with a relatively large supply of pressurized air. Tank 442 may be the same air source as provided for air brakes on large trucks. FIG. 28 also illustrates the transmission of an away from center movement of the drag link 12' to the centering lever 14, which corresponds to the position of the follower assembly shown in FIGS. 22 and 23.

Another centering compensator embodiment 450 is shown in FIGS. 29–35. In this embodiment, a cam surface 452 is provided on the inside surface of an annular wall 456 of a housing 454, which also has a bottom wall 458 and a top wall 459, which together with annular wall 456 enclose a follower assembly chamber 460. The housing 454 also includes a depending flange 462, which may extend downwardly from bottom wall 458 as shown, or between bottom wall 458 and top wall 459, for mounting the housing 454 on an adjacent part of a frame of a vehicle.

Figure 30:
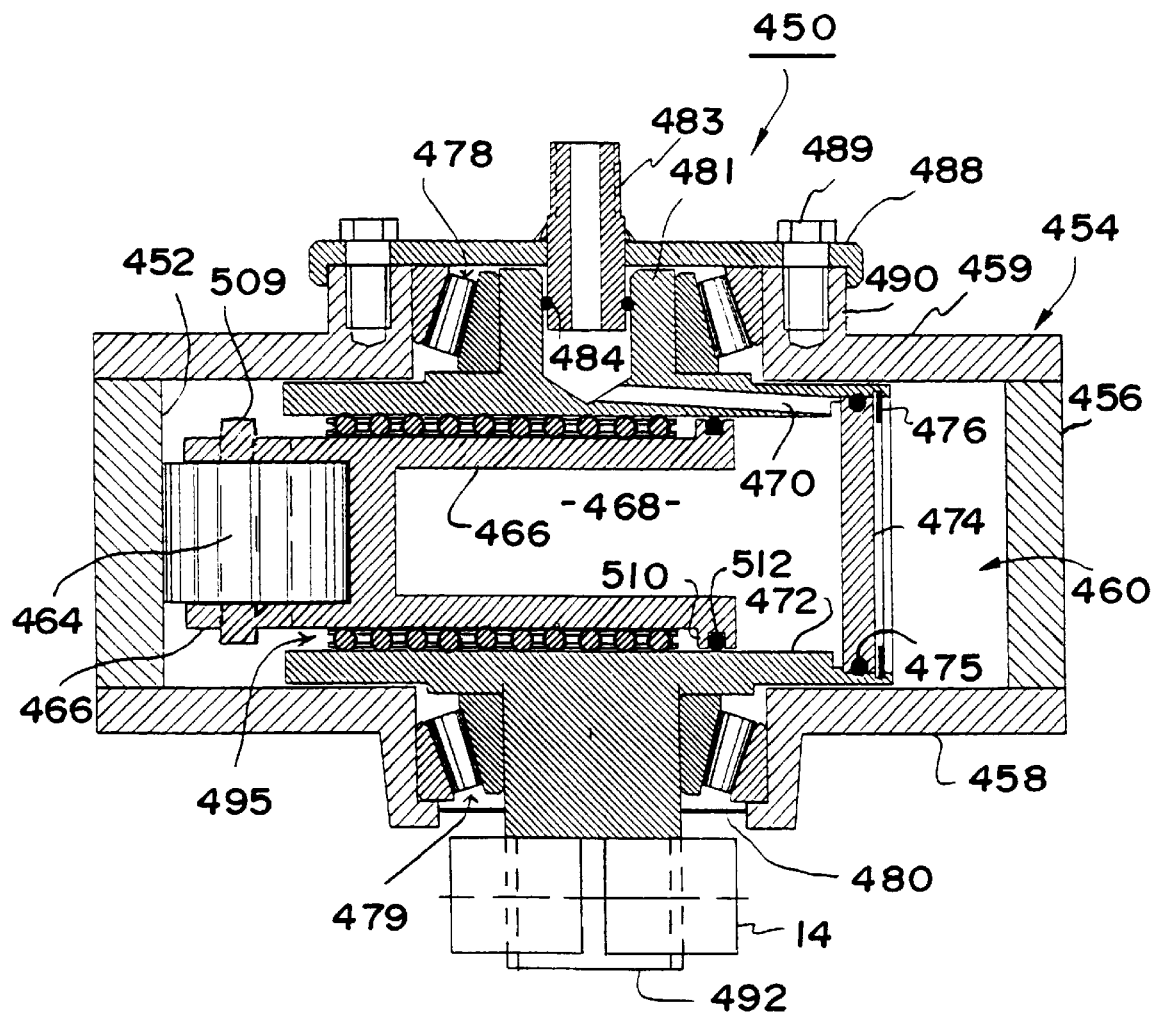
FIG. 30 is a sectional side view taken along line 30—30 of FIG. 29.

The follower assembly includes a follower roller 464 for engaging the cam surface 452, and the roller 464 is rotatably mounted on a hollow piston member 466 for biasing the roller against the cam surface in response to a pressurized fluid supplied to a centering chamber 468 through a passage 470 in an elongated cylinder 472. The end of centering chamber 468 opposite to roller 464 is closed by a cylinder cap 474 having an O-ring seal 475 and secured in position by a snap ring retainer 476 (FIG. 30). The cylinder 472 is mounted for rotation in the compartment 460 of the housing 454 by opposing sets of roller bearings 478 and 479. The bearings 479 are protected from dust and other debris by an annular dust seal 480, whereas the bearings 478 are protected from dust and other debris by a cover plate 488 as discussed below.

The cylinder passage 470 is supplied with a pressurized biasing fluid, preferably air, by means of a hollow boss 481 and a port nipple 483 that are sealed to each other for relative movement by an O-ring seal 484. The boss 481 may be formed integrally with the cylinder 472. The respective bottom and top plates 458 and 459 are secured together by four bolts (not shown) that pass through apertures 486 in annular wall 456, and the nipple 483 is welded to the cover plate 488, which in turn is bolted by four bolts 489 (only two of which are shown) threaded into a boss 490 extending upward from top plate 459, as may be seen best in FIG. 30. The centering lever 14 is carried by a centering shaft 492 that may be integrally formed with the cylinder 472 on the bottom side thereof opposite to boss 481.

A linear slide bearing assembly 495, which has an overall cylindrical shape, is fitted between the cylindrical outer surface of piston 466 and the inner cylindrical surface of cylinder 472 in order to facilitate frictionless sliding movement between these components when transverse forces are applied thereto by the centering shaft. Structural details of the linear slide bearing assembly are shown in FIGS. 31–33. The linear bearing assembly comprises a double wall cage 497, which is preferably made of a low friction plastic, for holding in place and permitting free rotation of a plurality of ball bearings 499. The outer cage wall 501 of the cage is adjacent to an outer race 503 provided by the inner surface of piston 472 and the inner cage wall 504 is adjacent to an inner race 505 provided by the outer surface of piston 466. The concentric walls 501 and 504 are held in a fixed, spaced apart relation by a plurality of interconnecting spacers 507. Axial travel of the bearing assembly 495 is limited by a pair of opposing ridges 509 and 510, the latter of which carries an O-ring piston seal or ring 512.

Figure 34:
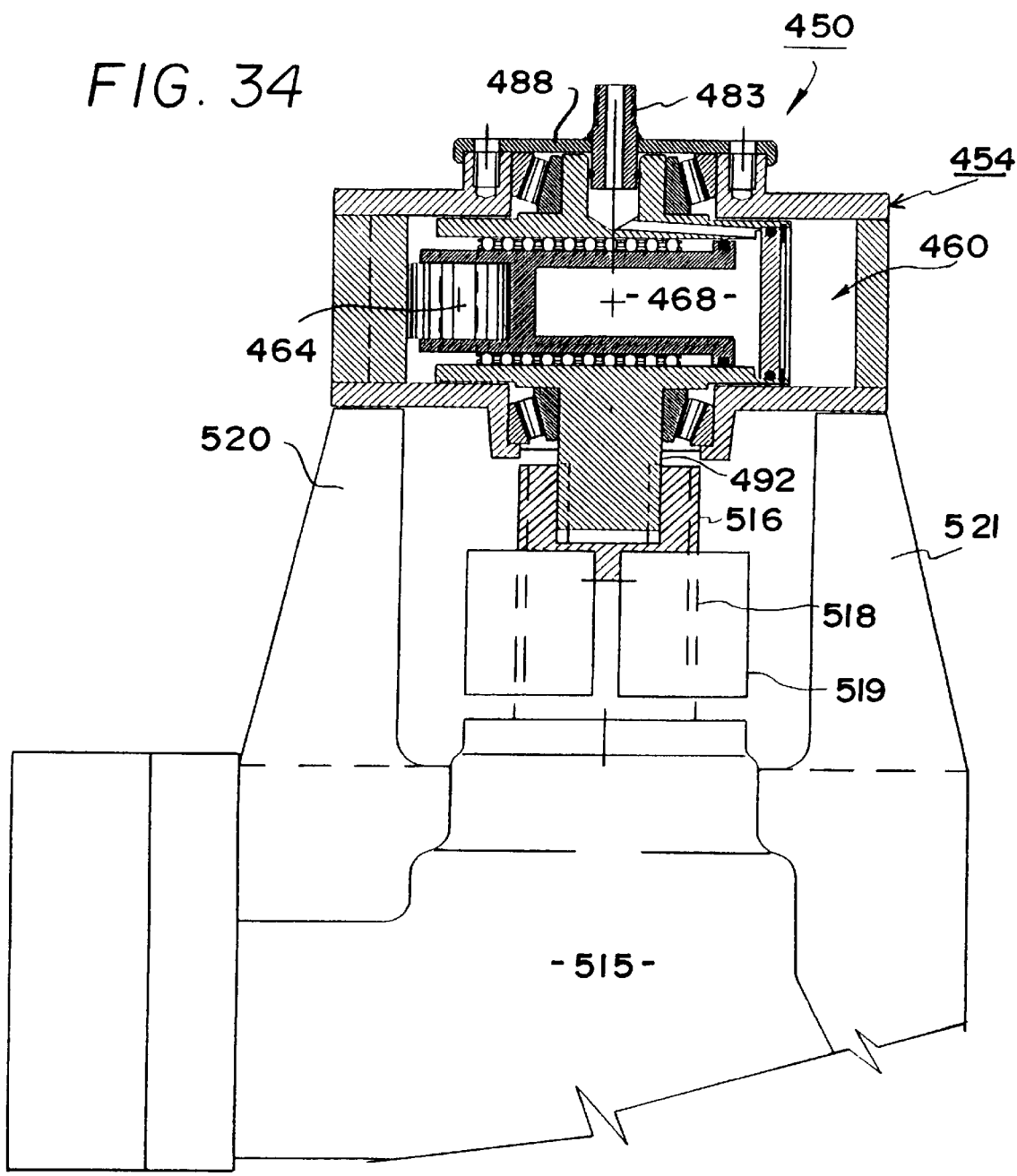
FIG. 34 is a partial sectional side view showing details of the mounting for the centering compensator of FIGS. 29–33.

In FIG. 34, the centering compensator 450 is shown mounted directly on a power steering gear box 515 where the centering shaft 492 is connected directly to the output shaft 516 of the gear box. In this arrangement, the centering lever connected to the vehicle steering system is carried on a spline 518 of the output shaft 516 and serves as the pitman arm 519 of the steering system. The range of rotary movement of the centering lever/pitman arm 519 is defined by the respective stop ears 520 and 521 formed directly on the housing of the gear box 515.

Figure 29:
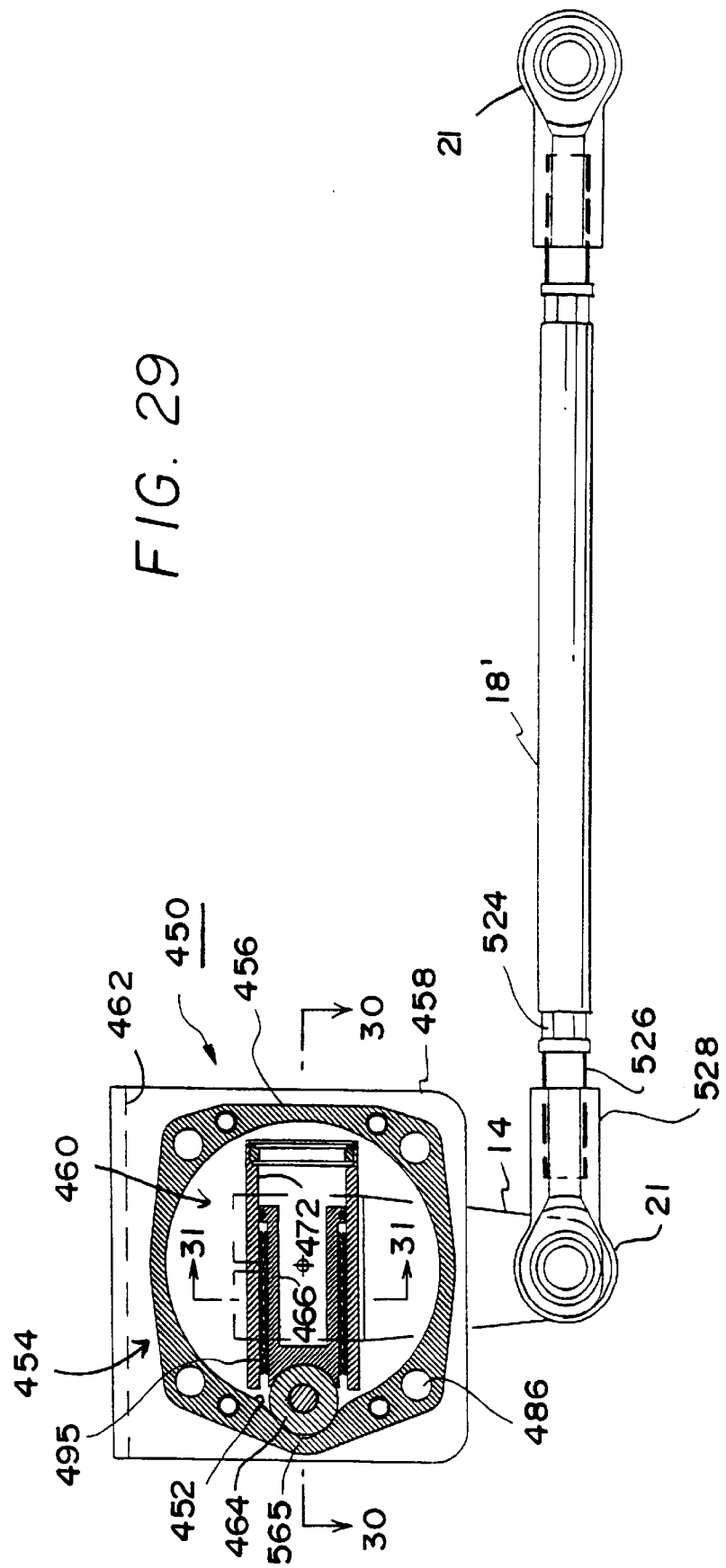
FIG. 29 is a sectional top view of another modification of the invention having alternative cam ring and cam follower features.

In the embodiment of FIG. 29, trimming adjustment of the center position of the steering system is accomplished mechanically by rotating the connecting rod 18' with a standard wrench (not shown) in engagement with the usual type of wrench lands 524. Turning the connecting rod 18' while threads 526 at its respective ends are in engagement with corresponding threads within the shank 528 of the two ball joints 21,21 functions as a turnbuckle structure, such that rotation in one direction pushes the ball joints 21,21 further apart, and rotation in the opposite direction pulls the ball joints 21,21 closer together. This changes the center position of the steering system relative to the center position of the follower roller 464.

In lieu of the localized mechanical trimming provided by the connecting rod 18' of FIG. 29, the length of the linkage between the centering compensator 450 and the vehicle steering system may be changed remotely by a hydraulic piston and cylinder assembly, such as the trimming assembly 530 shown in FIGS. 35 and 36. The trimming assembly 530 includes a dual piston assembly comprising a piston 532 that reciprocates in a cylinder 533 and a piston 535 that reciprocates in an axially aligned cylinder 536. A liquid reservoir 538 provides a source of hydraulic fluid (liquid) and is arranged to keep filled the respective centering chambers 540 and 541. The fluid in reservoir 538 is optionally under a slight pressure provided by a spring loaded diaphragm 543 to insure a filling flow.

When a trim button, such as button 230 in FIG. 27, is pushed, a solenoid 545 opens a valve 547 so that fluid may flow in either direction through a fluid passage 549, the direction of this flow being such as to equalize any pressure differential between trim chambers 540 and 541. As fluid flows to equalize a pressure differential, a corresponding movement by the pistons 532 and 535 changes the length of the connecting linkage between the ball joints 21,21. This can be readily seen by comparing the longer distance between ball joint center lines F and C in FIG. 35 with the shorter distance between ball joint center lines F' and C' in FIG. 36. When the trim button is released, valve 547 closes to keep constant the respective amounts of liquid thereby trapped in centering chambers 540 and 541, which in turn locks in position the pistons 532 and 535 and fixes the length of the linkage between the center axes of the ball joints. Also, when valve 547 is open, a liquid supply passage 550 is also opened to permit liquid from reservoir 538 to flow into the passage 549 and thereby replace any fluid that may have leaked pass either piston 532 or piston 535.

Figure 37:
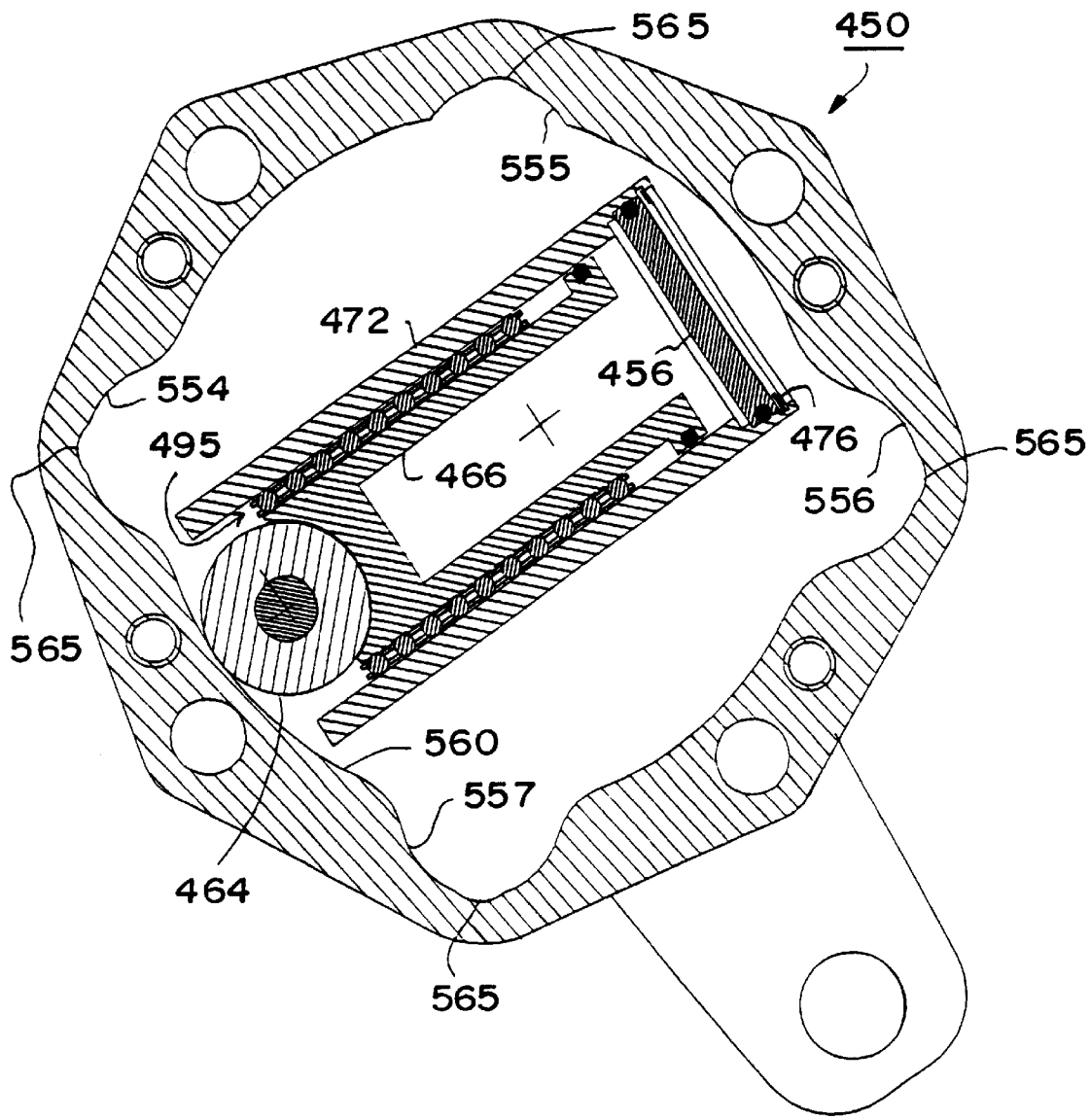
FIG. 37 is a sectional top view of a centering compensator similar to that of FIG. 29, but showing a modification of the cam ring.

The cam surface of the centering compensator 450 has only a single centering depression 453 which may restrict the locations at which the compensator housing may be located on a frame member of the vehicle. A greater freedom of positioning the housing of the centering compensator may be provided by increasing the number of depressions in the cam surface, such as illustrated by the multiple depressions 545, 555, 556 and 557 shown in FIGS. 37 and 38. FIG. 37 shows the follower roller 464 in an away from center position and FIG. 38 shows the follower roller 464 in its center position.

Figure 38:
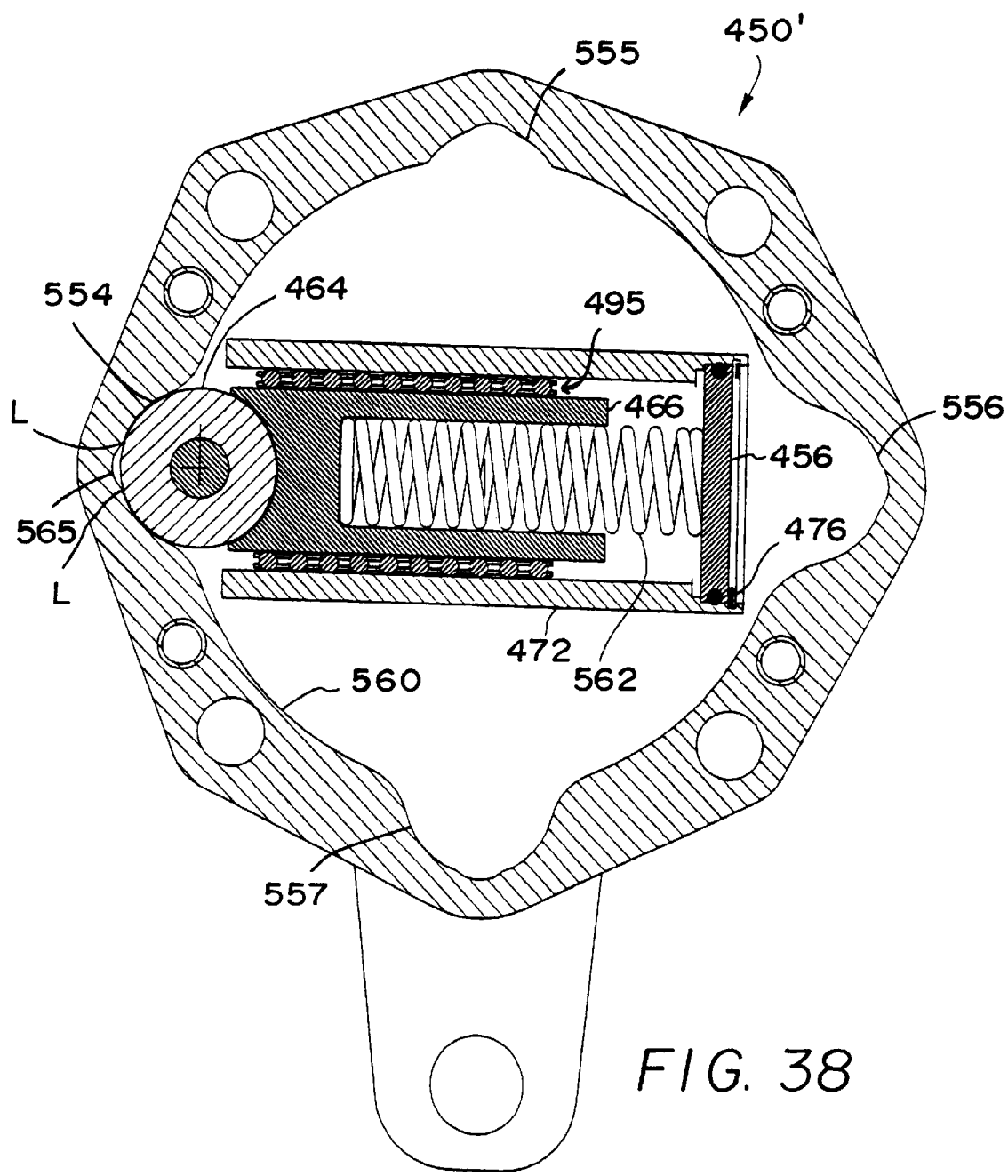
FIG. 38 is a sectional top view of a modified compensator similar to that of FIG. 37, but showing the cam follower mechanism moved away from its center position and modified to include a biasing spring.

FIG. 38 also illustrates additional modifications that may be incorporated in a centering compensator 450'. In this compensator embodiment, a coil spring 562 has been substituted for a pressurized fluid as the source of a biasing force for pressing follower roller 464 into one of the depressions, such as shown for depression 554 in this figure. As can also be seen clearly in FIG. 38, the bottom of each of the depressions is provided with a deeper recess 565 that provides parallel lines of contact L,L between the follower roller 464 and the depression 554 along opposite edges of the groove 565 because the radius of the depression is slightly greater than the radius of the follower roller. The lines of contact L,L provide for the precise, no-slack centering of the follower roller 464 in its center position within the depression 554, or in any of the other depressions shown in the cam surfaces of all embodiments shown and/or described in this disclosure. For example, although somewhat more difficult to see, a groove 565 is also provided in the centering depressions or detents shown in FIGS. 23, 24 and 29. See also the groove 65 and contact lines L,L in FIGS. 5 and 6.

Figure 39:
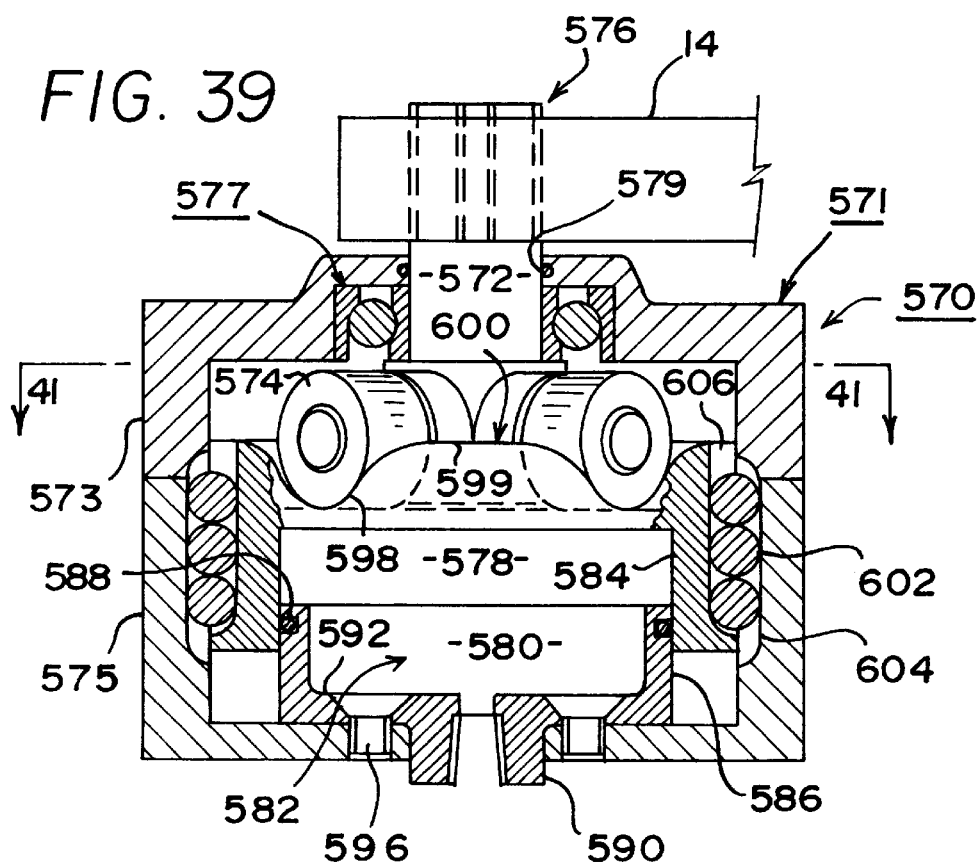
FIG. 39 is a side view in partial section taken along line 39—39 of FIG. 41, and shows a further modification of the invention having alternative cam ring and cam follower features.
Figure 40:
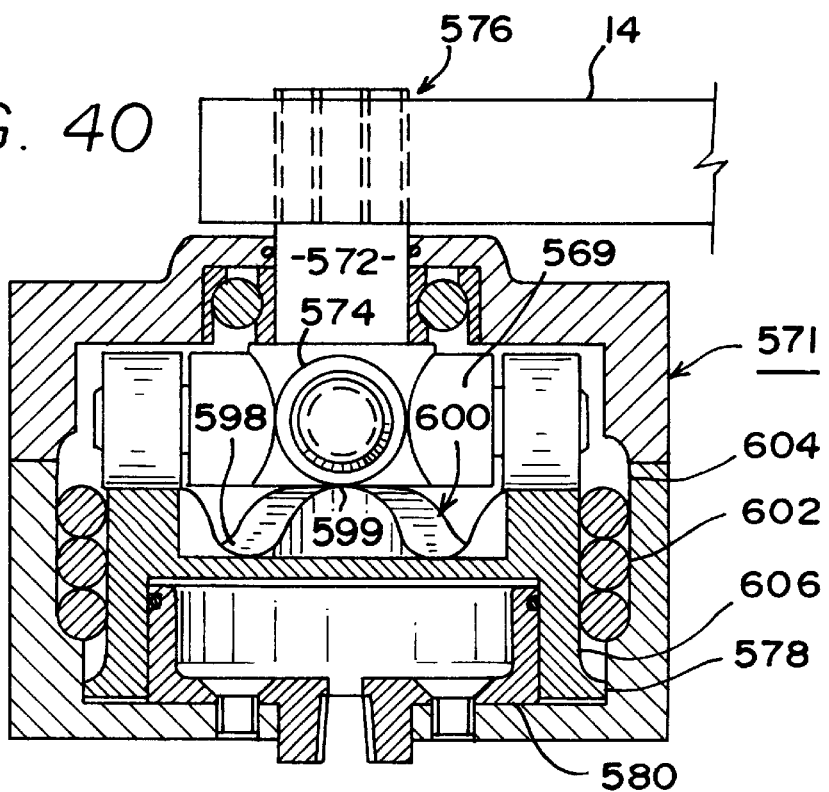
FIG. 40 is a side view in partial section similar to FIG. 39, but showing the cam follower mechanism moved away from its center position.
Figure 41:
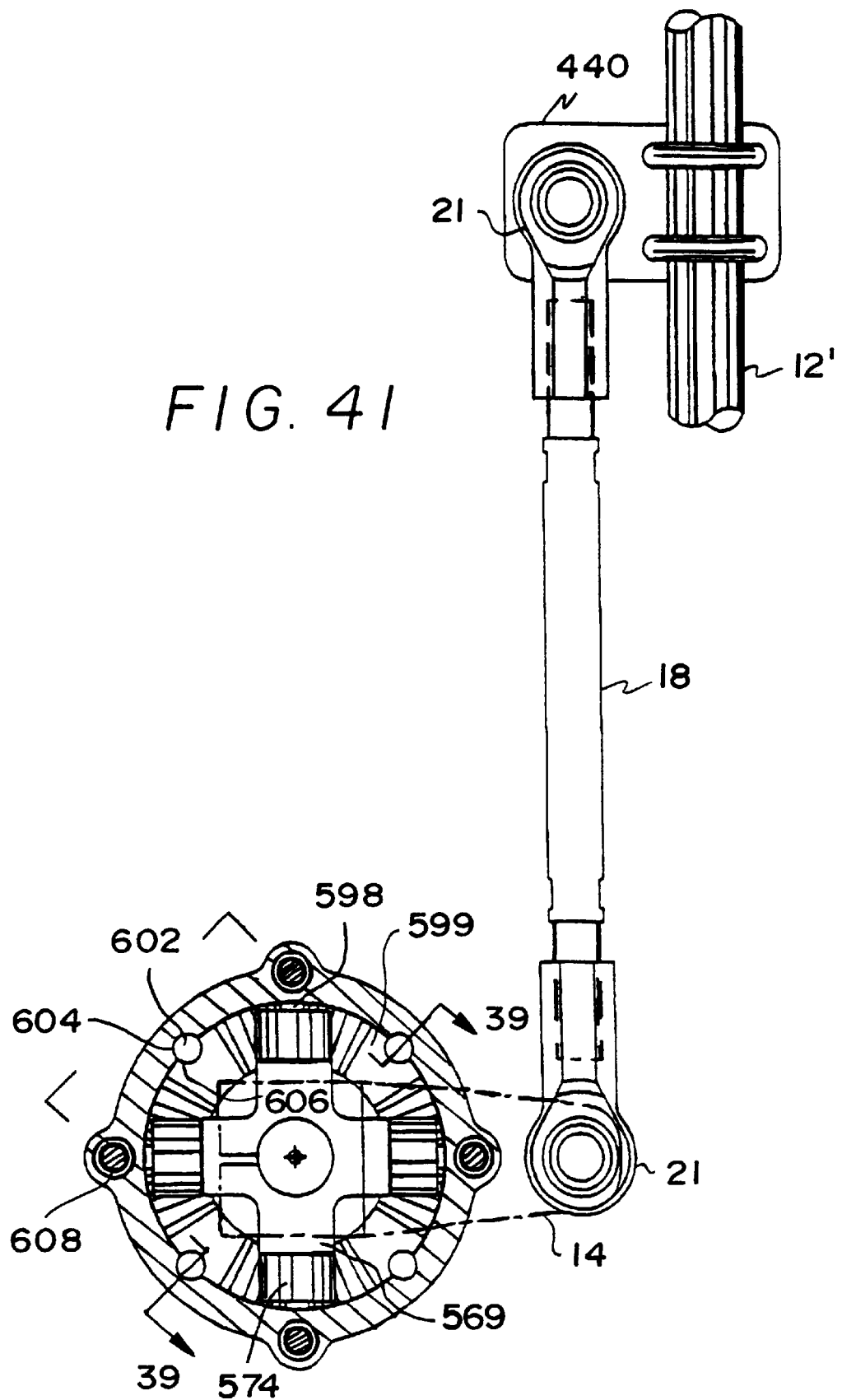
FIG. 41 is a sectional top view of the modified compensator taken along line 41—41 of FIG. 39, and also showing a phantom connection of the compensator to a vehicle steering system.

In FIGS. 39, 40 and 41, there is shown a further modification of the invention wherein a centering compensator 570 comprises a centering shaft 572 carrying four follower rollers 574 on corresponding arms 569 and having a spline connection 576 with a centering lever 14. Centering lever 14 is connected to the drag link 12' of a vehicle by a pair of ball joints 21,21, a connecting rod 18 and a bracket 440 in the same manner described above for other embodiments. The centering shaft 572 is rotatably mounted in an upper member 573 of a compensator housing 571 by a bearing assembly 577, and is sealingly engaged by an O-ring seal 579 to keep debris out of the housing. A source of pressurized fluid is communicated to a pressure chamber 582 through a nipple 590 integrally formed with the base 592 of an annular cup 580, which is fastened to a lower housing member 575 by a plurality of machine screws 596.

In this embodiment, the hollow underside of a cam ring 578 cooperates with the annular cup 580 to form the fluid pressure chamber 582, an inner cylindrical surface 584 of the cam ring being in sliding engagement with an outer cylindrical surface 586 of the annular cup, and the engagement between these two surfaces being sealed by an O-ring seal or piston ring 588. The cam ring 578 therefore functions as a reciprocating piston that extends when the follower rollers 574 are in their corresponding centering depressions 598 (FIG. 39) and retracts as the follower rollers are moved to the crest 599 of the cam surface 600 (FIG. 40).

A plurality of ball bearings 602 are provided between the outer periphery of cam ring 578 and the inner periphery of compensator housing 571. The ball bearings 602 are confined in a bearing race comprising a groove 604 in the sidewall of compensator housing 571 and a groove 606 in the sidewall of cam ring 578, there preferably being four such ball bearing and race combinations as shown in FIG. 41. As also shown in this figure, the upper housing member 573 may be secured to the lower housing member 575 by four bolts 608, which may be countersunk in the upper housing member 573 and in threaded engagement with the lower housing member 575.

It is also important to recognize that the centering compensators of the present invention engage the vehicle steering system at a location between the steerable wheels and the steering gear assembly from which extends the pitman arm. As a result, spurious inputs from the steering column and/or from a power steering unit are absorb by the compensator before these inputs can reach the steerable wheels. Likewise, spurious forces transmitted from the roadway are immediately absorbed in the compensator, rather than being transmitted through the entire steering assembly before encountering any stabilizing resistance from the steering wheel. As a result, the centering compensator protects the interior components of the steering assembly from the wear caused by repeated oscillations between states of tension and compression.

By varying the contact pressure between the cam rollers and cam ring through control of fluid pressure in the centering chamber, the break away resistance and the centering return force produced by the invention can be increased or decreased as desired. Manual pressure control in either of the embodiments may be provided by a hand held switch biased to the off position, such as switch 230, or by a manually adjustable fluid pressure regulator, such as regulator 242. The range of pressures available may be selected so that break away resistance can be varied from relatively low at low speeds to relatively high at high speeds. The fluid pressure also may be controlled automatically in response to vehicle speed, such as by using computer 260 to control a reversible electric motor for operating a pressure regulator in direct response to vehicle speed.

The embodiments of the invention disclosed herein may be used with other tie rod arrangements and with steering systems that do not require tie rod arrangements, such as those with only one steerable member, such as the rudder of a ship or an airplane. Without the centering compensator of the present invention, spurious steering forces of relatively small magnitude can cause the steering systems of all human occupied vehicles to move to one side or the other of center or to oscillate back and forth, thereby producing corresponding movements of the vehicle away from the desired direction of vehicular travel. In the operation of roadway motor vehicles, such spurious inputs may be caused by road forces acting on the vehicle wheels, environmental forces acting on the vehicle body, driver forces acting on the steering wheel, off-center bias inherent in the steering system itself, or any combination of one or more of these forces.

The various components described as part of a specific embodiment may also be used with the other embodiments of the invention described herein. For example, the reciprocating piston arrangement of FIGS. 19–23 for biasing the centering shaft may be combined with reciprocating cam ring arrangement of FIGS. 39–41, such that the follower rollers on the one hand and the cam surface on the other hand are each resiliently biased toward the other. As another example, the reversible electric motor 135 operable by toggle switch 186 may be substituted for the pressure actuated trim assemblies and push button switches of FIGS. 17 & 18 so that the compensator of FIGS. 14 and 15 may be operated by the fluid systems of FIGS. 17 and 18. Also, the compensator of FIGS. 2–4 may be operated by the same fluid systems, but without the trimming features of those systems. In other words, the resistance and return force components of the invention can be used alone as a centering unit without the remote trimming features. In addition, a number of other modifications to both the centering assembly components and the trim assembly components specifically described herein are possible without departing from the scope of the invention, as defined by the claims below.

What is claimed is:

1. A compensating apparatus for providing a resistance force resisting steering forces tending to move at least one steerable member to either side of a selected position relative to frame means for carrying said steerable member, said apparatus comprising:
    cam means including a cam ring having a cam surface extending along a portion thereof, said cam surface including at least one centering depression;
    means for mounting said cam ring in at least one static rotational position relative to said frame means;
    cam follower means including at least one follower member arranged to contact said cam surface and having a center position in simultaneous contact with opposite sides of said centering depression, a centering shaft, at least one follower arm connected to and extending laterally from said centering shaft and having means at a distal end for carrying said follower member, means for mounting said centering shaft for rotational movement relative to said cam ring, and rotation means for causing said rotational movement of said centering shaft in response to said steerable member movement; and,
    actuating means for applying a resilient force to at least one of said cam ring and said centering shaft to cause said follower member to be pressed into said centering depression when in said center position and into contact with at least another segment of said cam surface when away from said center position, said resilient force causing said follower member to provide said resistance force at least when said follower member is pressed into said centering depression.

2. An apparatus according to claim 1, wherein said actuating means comprises a movable member arranged for sliding movement relative to a fixed member to apply said resilient force to said follower member.

3. An apparatus according to claim 1, wherein said cam surface extends along an edge portion of said cam ring and includes a plurality of said centering depressions; wherein said follower means includes a plurality of said follower members each corresponding to a different one of said centering depressions and being carried on a corresponding follower arm connected to and extending laterally from said centering shaft; and wherein said actuating means causes each of said follower members to be pressed into its corresponding centering depression when in said center position and into contact with another corresponding segment of said cam surface when away from said center position.

4. An apparatus according to claim 1 for use on a vehicle having a steering system including said at least one steerable member, wherein said mounting means includes a housing connected to said frame means; and wherein said apparatus further comprises trim means for changing the center position of said follower member so as to selectively vary said selected position of said steerable member while said vehicle is in operation, said trim means comprising positioning means for varying the rotational position of the cam ring relative to said housing in response to at least one remote input such that said cam ring can be held in a plurality of static rotational positions relative to said frame means, and control means for selectively providing said at least one remote input to said positioning means from a location remote to said cam ring, such as a driver's station of said vehicle.

5. An apparatus according to claim 4, wherein said cam ring releasably engages said housing and said positioning means comprises means for releasing said cam ring from said engagement in response to said remote output, said released cam ring being rotatable by said follower member to change the static position of said cam ring relative to said frame.

6. An apparatus according to claim 1, wherein said actuating means comprises control means for varying from a location remote from said actuating means the amount of said resilient force applied to at least one of said cam ring and said centering shaft, said variations in the resilient force causing corresponding changes in said resistance force.

7. An apparatus according to claim 6, wherein said control means comprises means responsive to a sensed condition for automatically adjusting the amount of said resilient force.

8. An apparatus according to claim 7 for use on a vehicle having a steering system that includes said at least one steerable member, wherein said control means comprises means responsive to a speed of said vehicle for automatically adjusting the amount of said resilient force.

9. An apparatus according to claim 1, wherein said cam surface has opposite extensions each of which extends from a corresponding side of said centering depression, and the shape of which is such that, when it is in contact with said follower member, said follower member is biased relative to said cam ring by a return force tending to return said follower member to its center position in said centering depression.

10. An apparatus according to claim 1, wherein said actuating means comprises a centering piston arranged in a centering chamber for applying said resilient force, and fluid means for providing a pressurized fluid in said centering chamber so that fluid pressure provides said resistance force by causing said follower member to oppose movement of said steerable member toward either side of said selected position; and wherein segments of said cam surface on opposite sides of said centering depression are shaped so that said fluid pressure causes said follower member to provide a return force biasing said steerable member toward said selected position during at least part of the movement of said steerable member to either side of said selected position.

11. An apparatus according to claim 10, wherein said fluid means includes means for controllably varying said fluid pressure so as to vary at least one of said resistance force and said return force.

12. An apparatus according to claim 11, wherein said fluid is a liquid and said liquid flows to and from said centering chamber via centering conduit means, and wherein said centering conduit means includes a pressure actuated valve means for preventing fluid flow from said centering chamber until engagement between said follower member and said cam surface produces a fluid pressure differential above the pressure of the fluid provided by said fluid means.

13. An apparatus according to claim 10 for use on a vehicle having a steering system that includes said at least one steerable member, wherein said fluid means comprises pressurizing means for providing a pressurized fluid in said centering chamber, wherein said pressurizing means comprises gas pressure means for applying pressure provided by a pressurized gas to the fluid in said centering chamber, and control means for adjusting the amount of said gas pressure to vary said resistance and return forces.

14. An apparatus according to claim 1 for use on a vehicle having a steering system including said at least one steerable member, wherein said mounting means includes a housing which is connected to said frame means and in which said cam ring is mounted for clockwise and counter-clockwise rotation; wherein said apparatus further comprises trim means for changing the center position of said follower member so as to selectively vary said selected position of said steerable member while said vehicle is in operation; and wherein said trim means comprises a gear train for causing said rotation of the cam ring, driving means for driving said gear train in response to at least one remote input, and control means for selectively providing said at least one remote input to said driving means from a location remote to said cam ring, such as a driver's station of said vehicle, said rotation of the cam ring by said gear train causing a change in the static rotational position of said cam ring relative to said frame and a corresponding change in said center position of the follower member.

15. An apparatus according to claim 14, wherein a driven gear at a driven end of said gear train is connected to said cam ring through a slide plate engaged by an eccentric journal mounted eccentrically to a rotational axis of said driven gear, said slide plate being slidable in a slideway of said cam ring such that rotation of said driven gear in one direction causes said cam ring to rotate in said clockwise direction and rotation of said driven gear in another direction causes said cam ring to rotate in said counterclockwise direction.

16. An apparatus according to claim 5, wherein said positioning means comprises a brake member having a brake surface, and at least one engaging member having an engaging surface and movable between an engaged position in which said engaging surface is in engagement with the brake surface of said brake member and a released position in which said engaging surface is out of engagement with the brake surface of said brake member; and wherein said releasing means causes said engaging member to move between said engaged position and said released position in response to said remote input.

17. An apparatus according to claim 16, wherein said brake member is fixed to said housing and said engaging member is carried by said cam ring and moves axially between said engaged position and said released position.

18. An apparatus according to claim 17, wherein said engaging surface and said brake surface are conically shaped surfaces arranged parallel to each other.

19. An apparatus according to claim 16, wherein said engaging member comprises at least one shoe element and said brake member comprises a drum element fixed to said cam ring and having said brake surface engagable by said shoe element, and wherein one end of said shoe element is pivotally connected to said housing and another end of said shoe element is connected to an actuator arranged to pivot said shoe element between a drum engaging position and a released position out of engagement with said drum element.

20. An apparatus according to claim 10, wherein said centering piston and said centering chamber are located on a side of said cam ring opposite to a connection between said rotation means and said centering shaft.

21. An apparatus according to claim 10, wherein said centering piston and said centering chamber are located between said cam ring and a connection between said centering shaft and said rotation means.

22. An apparatus according to claim 1, wherein said cam surface extends along an inner arc of said cam ring; wherein said follower arm is connected to and extends laterally from said centering shaft and comprises a piston element and a cylinder element arranged for reciprocal relative movement such that the length of said follower arm is variable; and wherein said actuating means comprises resilient means for resiliently biasing said piston element and said cylinder element away from each other.

23. An apparatus according to claim 22, wherein said resilient means comprises fluid means for pressurizing said cylinder element to bias said piston and cylinder elements away from each other.

24. An apparatus according to claim 22, wherein said resilient means comprises spring means arranged to bias said piston element and said cylinder element away from each other.

25. An apparatus according to claim 22, wherein sliding means is interposed between said piston element and said cylinder element to facilitate relative sliding movement therebetween; and wherein said sliding means comprises a cage member having an inner wall with a plurality of apertures and an outer wall with a plurality of apertures aligned with the apertures of the inner wall, and a plurality of ball bearings each held between said walls in a corresponding pair of said aligned apertures and extending through said aligned apertures beyond said inner and outer walls such that each ball engages both an outer race surface on said piston element and inner race surface on said cylinder element.

26. An apparatus according to claim 2, wherein said actuating means further comprises a spring member for biasing said movable member away from at least a portion of said fixed member.

27. An apparatus according to claim 2, wherein said fixed member is a cylinder and said movable member is a piston arranged to form a pressure chamber with said cylinder, and wherein said actuating means further comprises a fluid system for providing a pressurized fluid in said pressure chamber.

28. An apparatus according to claim 27, wherein said piston member is arranged to apply said resilient force to said centering shaft.

29. An apparatus according to claim 27, wherein said piston member is arranged to apply said resilient force to said cam ring.

30. An apparatus according to claim 29, wherein said piston member comprises a hollow portion of said cam ring, and said fixed member comprises an annular cup slidable received within the hollow portion of said cam ring and cooperating with said hollow portion to provide said pressure chamber.

31. An apparatus according to claim 30, further comprising a housing to which said annular cup is secured, and wherein said actuating means further comprises bearing means interposed between the inner periphery of a wall of said housing and an outer periphery of said cam ring.

* * * * *